United States Patent
Boehm et al.

(10) Patent No.: US 10,558,569 B2
(45) Date of Patent: Feb. 11, 2020

(54) CACHE CONTROLLER FOR NON-VOLATILE MEMORY

(71) Applicant: Hewlett Packard Enterprise Development LP, Houston, TX (US)

(72) Inventors: Hans Boehm, Palo Alto, CA (US); Dhruva Chakrabarti, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 66 days.

(21) Appl. No.: 15/031,805

(22) PCT Filed: Oct. 31, 2013

(86) PCT No.: PCT/US2013/067841
§ 371 (c)(1),
(2) Date: Apr. 25, 2016

(87) PCT Pub. No.: WO2015/065449
PCT Pub. Date: May 7, 2015

(65) Prior Publication Data
US 2016/0246724 A1    Aug. 25, 2016

(51) Int. Cl.
*G06F 12/00* (2006.01)
*G06F 12/0831* (2016.01)
(Continued)

(52) U.S. Cl.
CPC ...... *G06F 12/0833* (2013.01); *G06F 11/3037* (2013.01); *G06F 12/0238* (2013.01); *G06F 12/0804* (2013.01); *G06F 12/0806* (2013.01); *G06F 12/128* (2013.01); *G06F 2201/81* (2013.01); *G06F 2201/86* (2013.01); *G06F 2201/88* (2013.01); *G06F 2201/885* (2013.01); *G06F 2212/202* (2013.01); *G06F 2212/621* (2013.01)

(58) Field of Classification Search
None
See application file for complete search history.

(56) References Cited

U.S. PATENT DOCUMENTS 5,895,488 A * 4/1999 Loechel .............. G06F 12/0804
                                                     711/135
6,119,205 A    9/2000 Wicki et al.
(Continued)

OTHER PUBLICATIONS

Bhandari et al, HPL-2012-236, Implications of CPU Caching on Byte-addressable Non-Volatile Memory Programming, Retrieved Sep. 24, 2013, 7 Pages.

(Continued)

*Primary Examiner* — Baboucarr Faal
(74) *Attorney, Agent, or Firm* — Trop, Pruner & Hu, P.C.

(57) ABSTRACT

Methods, apparatus, systems and articles of manufacture are disclosed to control a cache. An example method includes monitoring cache lines in a cache, the cache lines storing recently written data to the cache, the recently written data corresponding to main memory, comparing a total quantity of the cache lines to a threshold that is less than a cache line storage capacity of the cache, and causing a write back of at least one of the cache lines to the main memory when a store event causes the total quantity of the cache lines to satisfy the threshold.

19 Claims, 7 Drawing Sheets

(51) Int. Cl.
*G06F 12/0804* (2016.01)
*G06F 11/30* (2006.01)
*G06F 12/02* (2006.01)
*G06F 12/0806* (2016.01)
*G06F 12/128* (2016.01)

(56) References Cited

U.S. PATENT DOCUMENTS

| | | | |
|---|---|---|---|
| 7,062,675 B1 | 6/2006 | Kemeny et al. | |
| 7,921,328 B1 | 4/2011 | Gulati et al. | |
| 2003/0084250 A1 | 5/2003 | Gaither et al. | |
| 2003/0212865 A1* | 11/2003 | Hicken | G06F 12/0804 711/135 |
| 2005/0138283 A1 | 6/2005 | Garney | |
| 2009/0089508 A1 | 4/2009 | Trika et al. | |
| 2010/0106895 A1* | 4/2010 | Condit | G06F 12/0804 711/103 |
| 2011/0252201 A1 | 10/2011 | Koren et al. | |
| 2012/0159077 A1 | 6/2012 | Steely, Jr. et al. | |
| 2012/0246410 A1 | 9/2012 | Xu | |
| 2012/0317367 A1* | 12/2012 | Grayson | G06F 12/0804 711/143 |
| 2014/0068183 A1* | 3/2014 | Joshi | G06F 12/0866 711/114 |
| 2014/0095810 A1* | 4/2014 | Loewenstein | G06F 17/30501 711/148 |
| 2014/0122809 A1* | 5/2014 | Robertson | G06F 12/084 711/141 |
| 2015/0052313 A1* | 2/2015 | Ghai | G06F 9/467 711/136 |
| 2015/0293856 A1* | 10/2015 | Zhang | G06F 3/00 711/114 |
| 2016/0055095 A1 | 2/2016 | Faraboschi | |
| 2018/0032439 A1* | 2/2018 | Jenne | G06F 12/0891 |
| 2018/0232308 A1* | 8/2018 | Kusters | G06F 3/065 |
| 2019/0179764 A1* | 6/2019 | Wang | G06F 12/0891 |

OTHER PUBLICATIONS

Condit et al., "Better I/O Through By-Addressable, Persistent Memory", SOSP 2009, 14 Pages.
International Searching Atuhority, The International Search Report and the Written Opinion, Jul. 28, 2014, 9 Pages.
Langen, P.D. et al., Limiting the Number of Dirty Cache Lines, Jan. 21, 2009, 6 pages.
Narayanan, et al., "Whole-system Persistence with Non-volatile Memories", APLOS 2012, 10 Pages.
Venkataraman et al., "Consistent and Durable Data Structures for Non-Volatile Byte-Addressable Memory", FAST '11, Retrieved Sep. 24, 2013, 15 Pages.

* cited by examiner

CACHE CONTROLLER FOR NON-VOLATILE MEMORY

BACKGROUND

A central processing unit (CPU) cache locally stores data from a main memory (e.g., a volatile memory device, a non-volatile memory device, etc.). Caches are often implemented using volatile memory to store data when powered and lose memory state when power is removed. Accordingly, data in a cache is typically lost or deemed unreliable in the event of a system shut down or power failure.

A CPU uses cache to increase the speed of data operations because accessing data in cache is much faster than performing read and/or write operations in main memory. For example, a CPU retrieves data from non-volatile main memory and stores the retrieved data in a cache line (e.g., 64 bytes of data) of the cache when the data is to be used, edited, manipulated, etc. via read and/or write operations. If the data is modified in the cache, then it is eventually written back to main memory. After modifying the data in the cache line, but before the modified data is written back from the cache to the main memory, the cache line storing the modified data is considered a dirty cache line. Dirty cache lines and/or other cache lines may be written back (e.g., flushed) to main memory (e.g., a volatile memory, non-volatile memory, etc.) when instructed by the CPU. Dirty cache lines may also be written back without an explicit software instruction to do so when the CPU requires the cache line space in the cache for other purposes.

DETAILED DESCRIPTION

Figure 1:
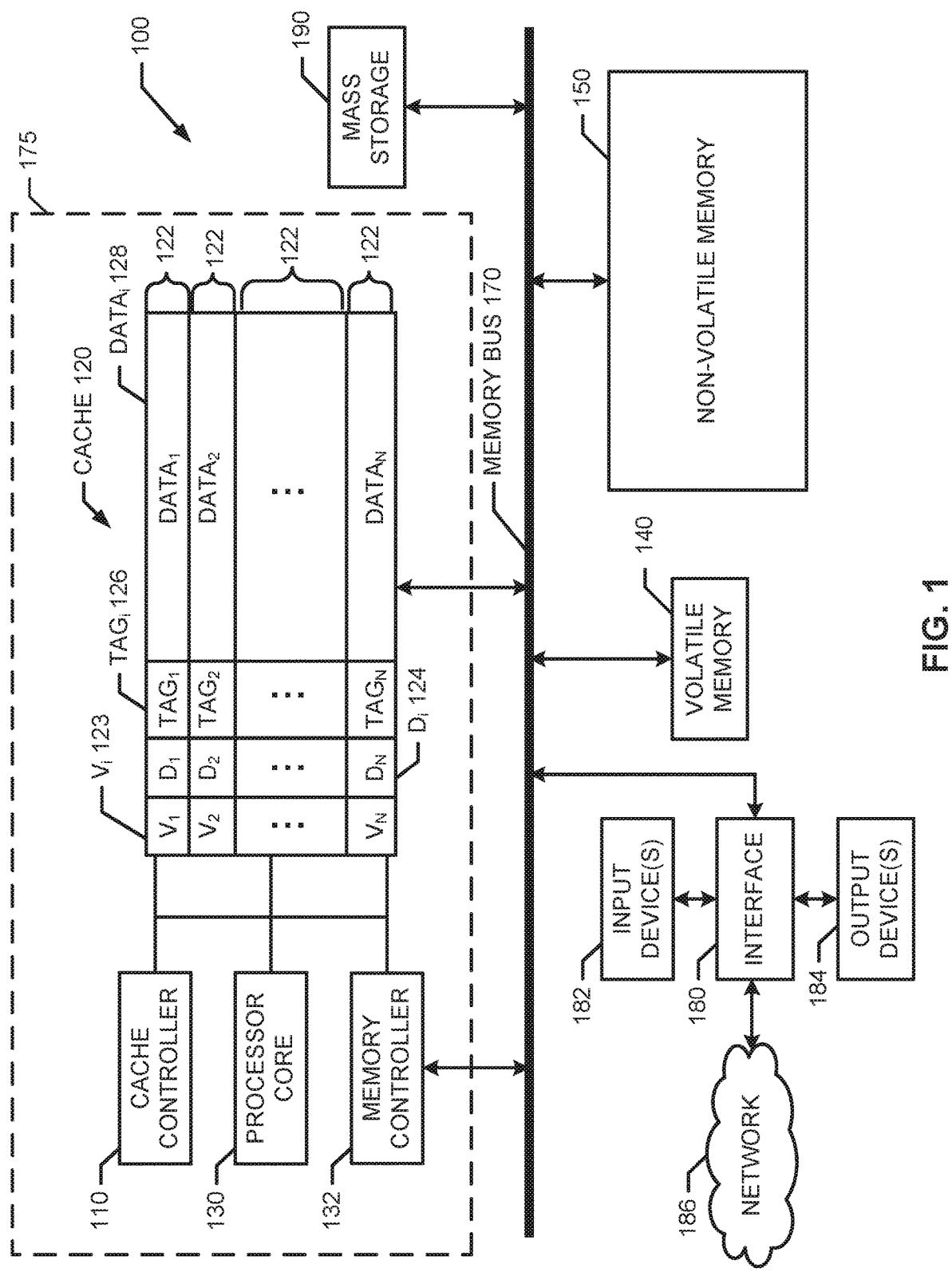
FIG. 1 is a block diagram of an example processor system having an example cache controller implemented in accordance with the teachings of this disclosure.

Example methods, apparatus, and articles of manufacture disclosed herein may be used to control a cache of a processor system. Examples disclosed herein may be used to control a quantity of cache lines that may be used to store data corresponding to non-volatile memory and to control a quantity of dirty cache lines storing modified data to be written back to the non-volatile memory.

Some examples disclosed herein involve monitoring cache lines storing recently written data to a cache, and comparing a total quantity of the cache lines to a threshold that is less than a cache line storage capacity of a cache. Examples disclosed herein further involve causing a write back of one or more of the dirty cache lines to the non-volatile memory when a store event causes the total quantity of the dirty cache lines to satisfy the threshold. In some examples, the threshold corresponds to a capacity of a data structure storing dirty cache line addresses (e.g., a number of entries in a hash table). In some examples, the threshold corresponds to a cache line capacity of a cache way of the cache. In such examples, the cache way is designated to store cache lines corresponding to only a non-volatile memory (e.g., a non-volatile memory of main memory).

In some examples disclosed herein utilizing a particular type of data structure, such as a hash table, a storage location in the hash table depends on a value of the cache line address to be tracked in the data structure. For example, multiple cache line addresses may be designated to be stored in a single location of the hash depending on their corresponding values. In such examples, a monitored threshold is satisfied for a particular store event when a newly monitored cache line address is to replace a previously monitored cache line address in a particular hash table location despite other empty locations being available. In some examples, each entry in the hash table will store only a particular cache line address or particular cache line addresses. In such examples, when the hash table entry is filled with a dirty cache line address but is to be used to store a newly identified dirty cache line address, the threshold is met because that hash line entry may only store one dirty cache line address at a time.

In some examples, when a store event creates a new dirty cache line, the cache line address corresponding to the newly created dirty cache line is added to the data structure. If the newly added dirty cache line address causes a number of dirty cache line addresses to meet or exceed the threshold, a dirty cache line is selected to be flushed (i.e., written back to non-volatile memory) and, the dirty cache line address corresponding to the selected dirty cache line is removed from the data structure.

In some examples, when a cache line address of a store event corresponds to an already dirty cache line (e.g., a cache line previously modified, but not yet written back to main memory), the store event does not create a new dirty cache line, and, thus, does not increment the number of dirty cache line addresses closer to threshold (e.g., a capacity limit of the data structure). For example, when an entry of a dirty cache line address data structure (e.g., a hash entry of a hash table) is already storing a dirty cache line address matching an address of a current store event, an address of the current store event does not need to be newly added to the dirty cache line address data structure.

In some examples, cache lines may be flushed as a background process. Some example methods involve selecting a dirty cache line to be written back to main memory using the background process before a total quantity of cache lines satisfies a threshold. In such examples, the write back is performed without being based on a store event.

Traditionally, for systems having a volatile main memory, caches are made as large as possible, subject to latency constraints, area constraints (on a device, such as an integrated circuit), and power constraints. A larger cache can often improve performance because processors are able to perform faster data accesses on more data stored locally in the cache. However, for systems having a non-volatile main memory, caches are frequently flushed to persist updated data in the non-volatile main memory. In some instances, caches are so large that flushing the caches (i.e., writing cache lines back to memory) uses many resources and causes so much latency that the benefits of having such large caches are diminished. Example methods, apparatus, and articles of manufacture disclosed herein control the number of dirty cache lines that are held in a cache and/or the number of cache lines corresponding to a non-volatile memory device to improve and/or reduce latencies for cache flushes and/or to efficiently perform cache line write backs. For example, the number of such cache lines is limited to be less than a threshold corresponding to a maximum capacity of a data structure (e.g., a hash table) storing dirty cache line addresses. In this manner, flushing a threshold number of cache lines that is less than a cache line storage capacity of a cache requires less time than flushing the entire cache.

As used herein, an address may be a virtual address, a physical address, and/or a physical location within a data structure. As used herein, a write back is defined as an event in which a cache line of a cache is written back to a main memory (i.e., the main memory location of the data is updated with the current version of the data that is located in the cache). As used herein, flushing a cache involves writing back data from the cache to a main memory device. In some examples, after data is written back during a cache line flush, the data is persisted in the cache, while in other examples the written back data is removed from the cache.

FIG. 1 is a block diagram of an example processor system 100 including an example cache controller 110 implemented in accordance with the teachings of this disclosure. The example processor system 100 also includes an example cache 120, an example processor core 130 (or a central processing unit (CPU)), an example memory controller 132, an example volatile memory 140, and an example non-volatile memory 150. An example memory bus 170 facilitates communication between the cache 120, the memory controller 132, the volatile memory 140, and the non-volatile memory 150. The processor system 100 may be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. The processor core 130 of the illustrated example is hardware. For example, the processor core 130 can be implemented by one or more integrated circuits, logic circuits, microprocessors or controllers from any desired family or manufacturer.

The example volatile memory 140 of FIG. 1 is any volatile memory storage device that stores data when powered, but loses memory state when power is removed. For example, the volatile memory 140 may be implemented by Synchronous Dynamic Random Access Memory (SDRAM), Dynamic Random Access Memory (DRAM), Static Random Access Memory (SRAM), RAMBUS Dynamic Random Access Memory (RDRAM) and/or any other type of volatile memory. The non-volatile memory 150 is any non-volatile memory storage device (e.g., phase-change memory, memristor memory, etc.) that is capable of storing data when powered and when not powered.

The example cache 120 is a local storage circuit that may be collocated on a same device 175 (e.g., a semiconductor chip) as the example processor core 130, the example memory controller 132, and/or the example cache controller 110. In the illustrated example of FIG. 1, the processor core 130 can perform faster read and/or write operations when accessing data in the cache 120 than when accessing data in the volatile memory 140 and/or in the non-volatile memory 150 via the memory bus 170. Accordingly, the example cache controller 110, the example processor core 130, and/or the example memory controller 132 may load data from the volatile memory 140 and/or the non-volatile memory 150 into the cache 120 so that the processor core 130 can access the data relatively faster using the cache 120. Different techniques may be used to determine how long the data remains in the cache 120. For example, the data may remain in the cache 120 as long as the processor core 130 is accessing it frequently. When data is modified in the cache 120, write back operations are used to perform the same modifications on the corresponding data in the volatile memory 140 and/or the non-volatile memory 150 so that the data in the cache 120 and corresponding data in the volatile memory 140 or corresponding data in the non-volatile memory 150 are the same. Without such write back operations, errors or system failures may occur as the storage devices 140 and 150 would not have an accurate and/or current version of the most recent data updated in the cache 120.

During operation, the example cache 120 may store both dirty cache lines and clean cache lines that correspond to data in the volatile memory 140 and/or the non-volatile memory 150. A dirty cache line is a cache line 122 of the example cache 120 that stores data (e.g., $DATA_1$, $DATA_2$, $DATA_N$) that has been modified since the time it was read into the cache 120 from the volatile memory 140 and/or the non-volatile memory 150. A clean cache line stores data (e.g., $DATA_1$, $DATA_2$, $DATA_N$) that has not been modified since the time it was read into the cache 120 from the volatile memory 140 and/or the non-volatile memory 150 (e.g., the main memory).

The example cache 120 of FIG. 1 has a storage capacity of N cache lines 122. Each cache line 122 includes an example valid bit ($V_i$) 123, an example dirty bit ($D_i$) 124, an example memory address ($TAG_i$) 126, and example cache line data ($DATA_i$) 128 (e.g., 64 bytes of data or any other data size). The valid bit ($V_i$) 123 indicates that corresponding cache line data ($DATA_i$) 128 is currently used to store data read into the cache 120 from a memory address ($TAG_i$) 126 of the volatile memory 140 and/or from a memory address ($TAG_i$) 126 of the non-volatile memory 150. The dirty bit ($D_i$) 124 indicates that corresponding data ($DATA_i$) 128 has been modified and that the corresponding data in the volatile memory 140 and/or in the non-volatile memory 150 at a memory address ($TAG_i$) 126 may be out of date (e.g., needs to be updated with the modified data ($DATA_i$) 128). In some examples, the cache 120 may be divided into cache ways. In such examples, each of the cache ways may store a limited number of the cache lines 122 (e.g., 128 cache lines). In some such examples, the cache controller 110 may control the type of cache lines that are stored in each cache way. For example, the cache controller 110 may control the cache such that one cache way of the cache 120 is used for data corresponding only to the non-volatile memory 150.

As disclosed herein, the cache controller 110 of FIG. 1 may be implemented via hardware, software, and/or firmware. The example cache controller 110 controls the amount and/or type of data that is stored in the cache 120 in accordance with this disclosure. More specifically, examples disclosed herein enable the cache controller 110 to control (e.g., limit) the number of cache lines that can be stored in the cache 120 (e.g., the number of cache lines from the non-volatile memory 150). The example cache controller 110 also controls (e.g., limits) the number of clean (i.e., unmodified) cache lines and the number of dirty cache lines in the cache 120 that correspond to the volatile memory 140 and/or the non-volatile memory 150.

The processor platform 100 of the illustrated example of FIG. 1 also includes an interface circuit 180. The interface circuit 180 may be implemented by any type of interface standard, such as an Ethernet interface, a universal serial bus (USB), and/or a Peripheral Component Interconnect (PCI) express interface.

In the illustrated example, one or more input devices 182 are connected to the interface circuit 180. The input device(s) 182 permit(s) a user to enter data and commands into the processor core 130. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 184 are also connected to the interface circuit 180 of the illustrated example. The output devices 184 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 180 of the illustrated example, thus, typically includes a graphics driver card, a graphics driver chip or a graphics driver processor.

The interface circuit 180 of the illustrated example also includes a communication device such as a transmitter, a receiver, a transceiver, a modem and/or network interface card to facilitate exchange of data with external machines (e.g., computing devices of any kind) via a network 186 (e.g., an Ethernet connection, a digital subscriber line (DSL), a telephone line, coaxial cable, a cellular telephone system, etc.).

The processor platform 100 of the illustrated example also includes one or more mass storage devices 190 for storing software and/or data. Examples of such mass storage devices 190 include floppy disk drives, hard drive disks, compact disk drives, Blu-ray disk drives, RAID systems, and digital versatile disk (DVD) drives. In some examples, the mass storage devices 190 may be implemented using the non-volatile memory 150.

Figure 3:
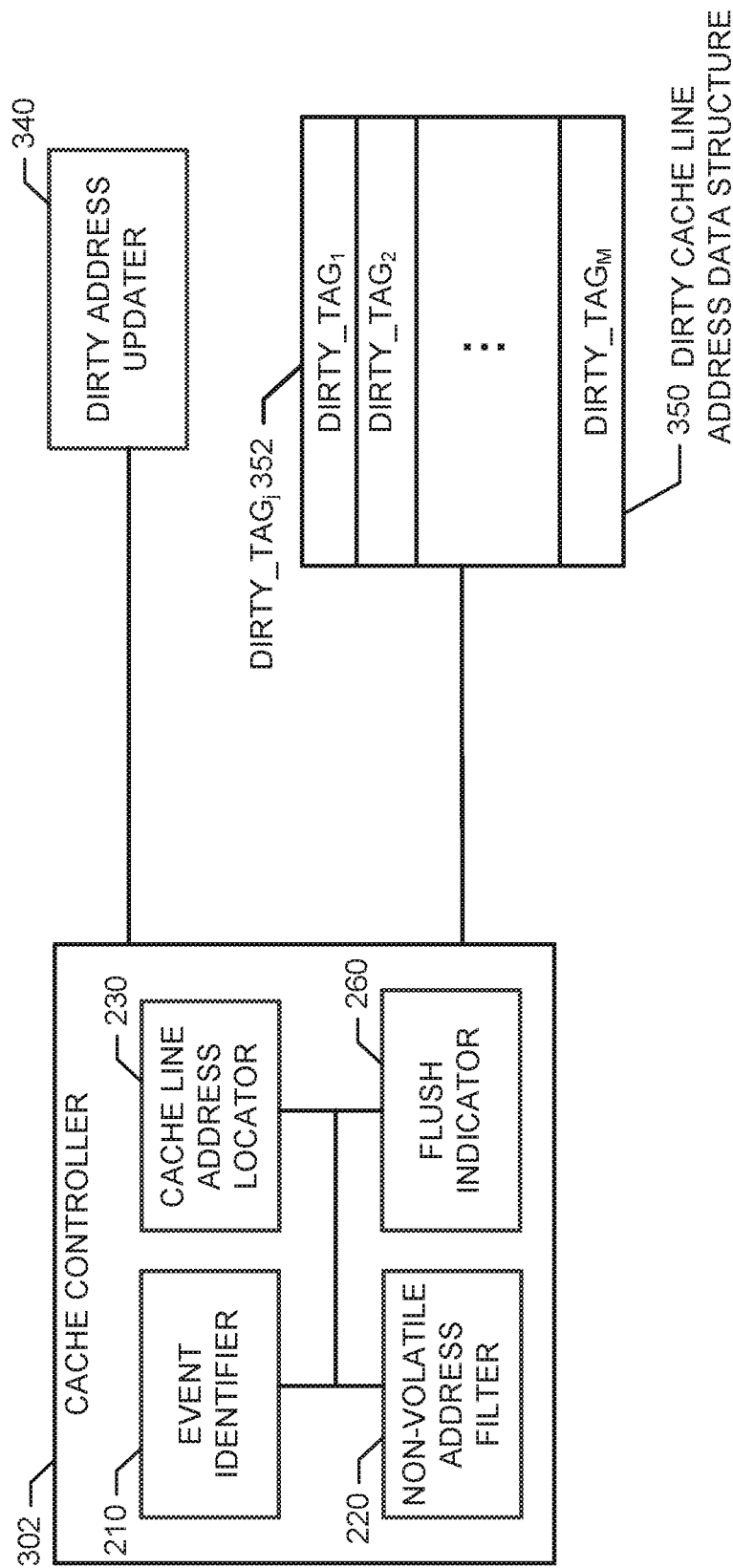
FIG. 3 illustrates another example cache controller in communication with an example dirty address updater and an example dirty cache line address data structure implemented in accordance with the teachings of this disclosure.
Figure 4:
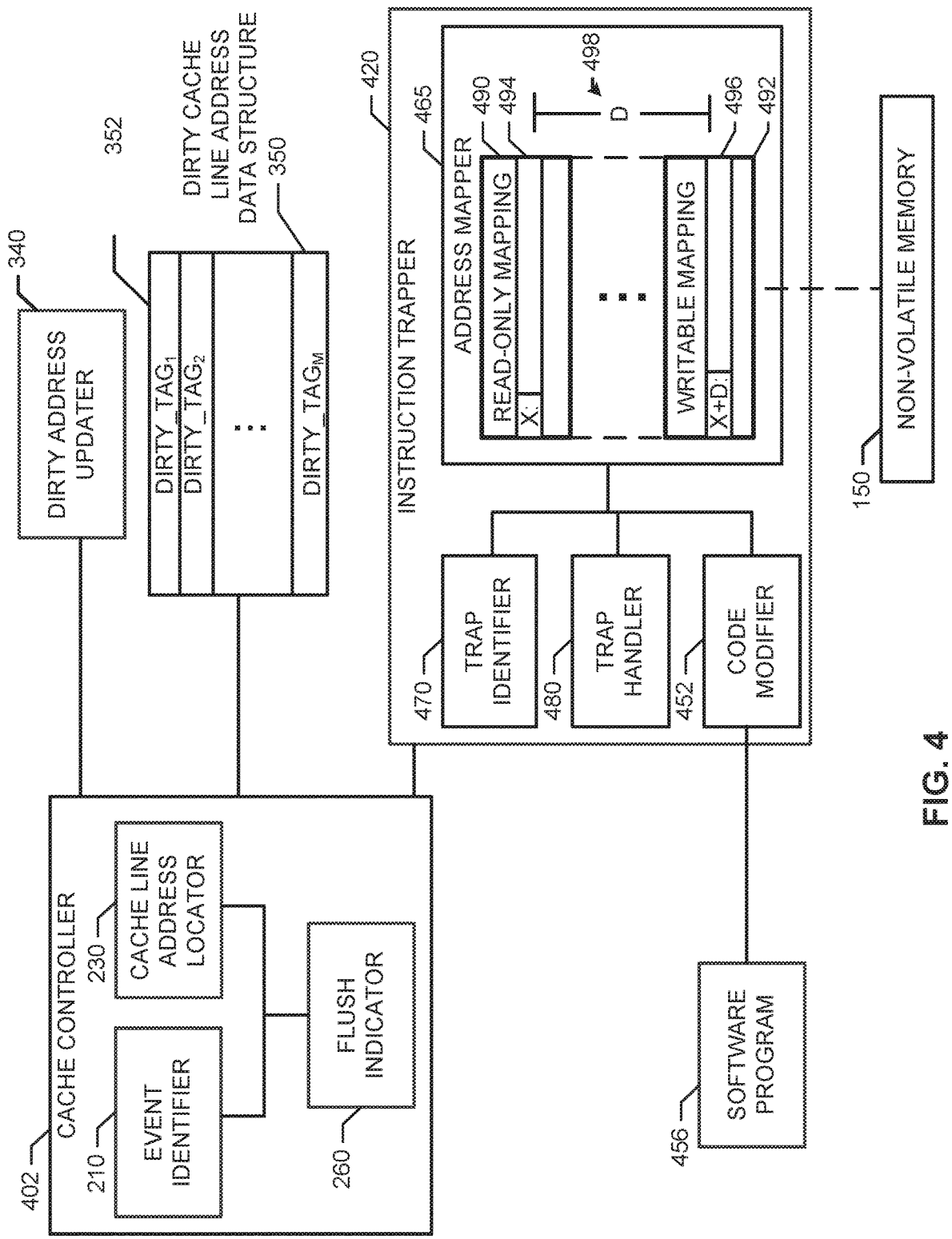
FIG. 4 illustrates another example cache controller in communication with an example dirty address updater, an example dirty cache line address data structure, and an example instruction trapper implemented in accordance with the teachings of this disclosure.

Examples disclosed herein may be implemented using one or more different hardware-based and/or software/firmware-based techniques. For example, FIG. 2 discloses example hardware-based implementations to track and control the number of dirty cache lines. FIGS. 3 and 4 illustrate software-based implementations to track and control a number of dirty cache lines.

Figure 2:
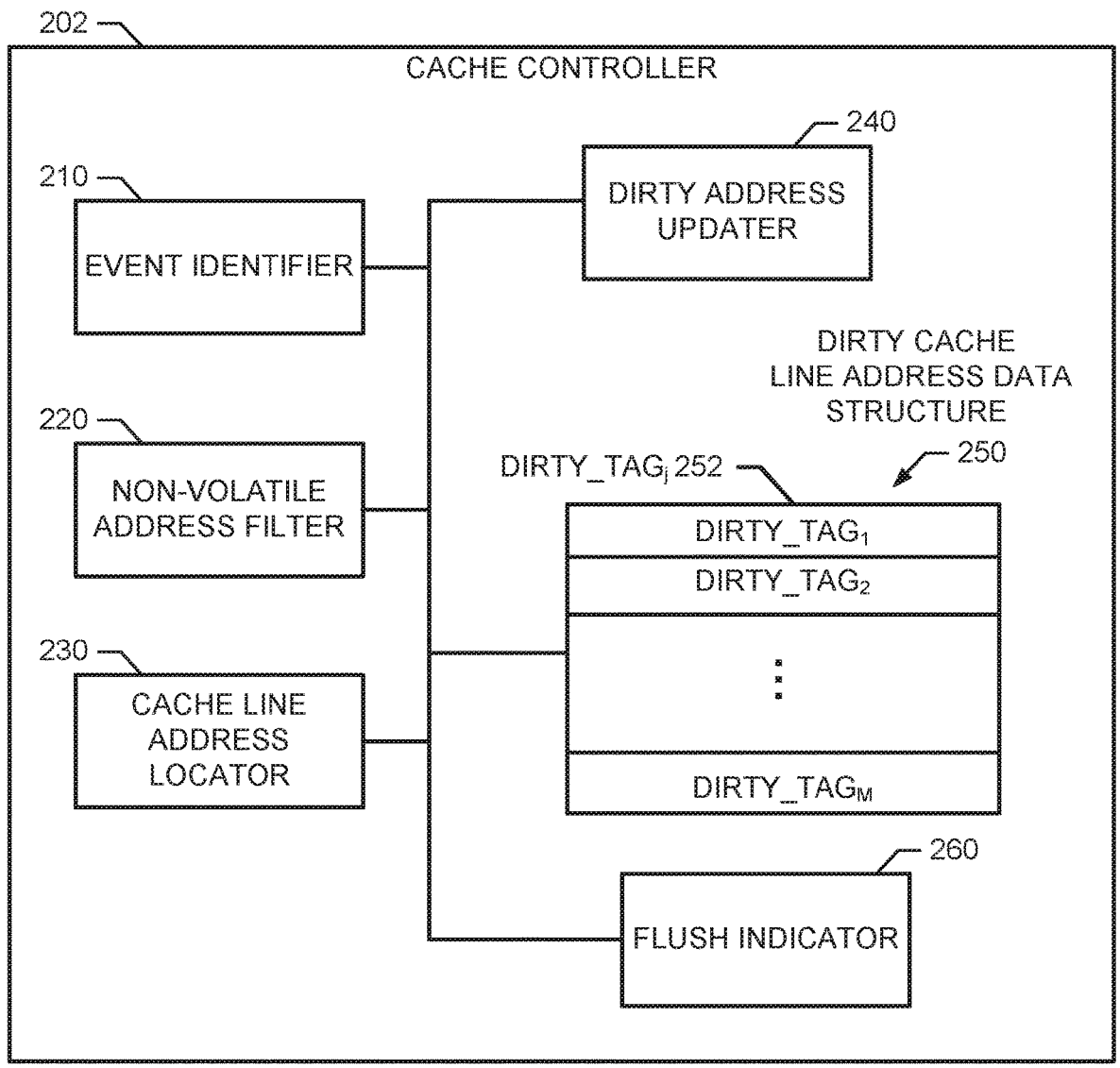
FIG. 2 illustrates an example cache controller that may be used to implement the cache controller of FIG. 1.

FIG. 2 is a block diagram of an example hardware representation of a cache controller 202, which may be used to implement the cache controller 110 of FIG. 1. The example cache controller 202 of the illustrated example of FIG. 2 includes an example event identifier 210, an example non-volatile address filter 220, an example cache line address locator 230, an example dirty address updater 240, an example dirty cache line address data structure 250, and an example flush indicator 260. In the illustrated example of FIG. 2, the example cache controller 202 is implemented using hardware. For example, the example event identifier 210, the example non-volatile address filter 220, the example cache line address locator 230, the example dirty address updater 240, the example dirty cache line address data structure 250, the example flush indicator 260, and/or more generally, the example cache controller 202 can be implemented by one or more integrated circuits, logic circuits, microprocessors or controllers from any semiconductor device manufacturer and/or any other semi-conductor based devices made by the semiconductor device manufacturer.

The example cache controller 202 of FIG. 2 controls the persistence of the data (DATA$_i$) 128 in the cache 120 of FIG. 1 using the dirty cache line address data structure 250. In the illustrated example, the cache controller 202 uses the dirty cache line address data structure 250 to control the quantity of cache lines 122 in the cache 120 that are allowed to store dirty data at any given time. For example, the cache controller 202 may limit the number of dirty cache lines 122 that are stored in the cache 120 for the non-volatile memory 150 to a number of entries corresponding to a maximum capacity M of the cache line address data structure 250, or some other threshold (e.g., a cache line capacity of a single cache way or multiple selected cache ways). For example, the cache controller 202 may use a capacity limit M (e.g., one cache line, 64 cache lines, 128 cache lines, etc.) of the dirty cache line address data structure 250 to limit the number of cache lines 122 in the cache 120 that store dirty data and/or that correspond to a location in the non-volatile memory 150. In some examples, the threshold number of dirty cache lines corresponding to the non-volatile memory 150 that are allowed to persist in the cache 120 at any given time is defined by a cache line capacity of a single cache way (or any other number of cache ways) of the cache 120. Some examples disclosed herein may limit the number of dirty cache lines corresponding to the non-volatile memory 150 to not exceed one cache way or multiple selected cache ways of the cache 120. For example, if only a single cache way having a 128 cache line capacity is selected to store dirty cache lines corresponding to the non-volatile memory 150, the capacity limit M of the dirty cache line address data structure 250 is 128 entries (or hashes). In some examples, for a particular store event, a relative threshold may be triggered when the store event identifies a dirty cache line address that is to be stored in a particular location of the dirty cache line address data structure 250. In such examples, the relative threshold is satisfied for a particular store event when the newly tracked cache line address replaces a previously tracked cache line address at the particular location.

In some examples, a threshold value M' that is less than the capacity limit of M entries in the dirty cache line address data structure 250 may be implemented. In such examples, the threshold value M' may be a user-selectable threshold value and/or automatically adjustable by the cache controller 202, the processor core 130, the memory controller 132, etc. In some examples, the capacity limit M of the dirty cache line address data structure 250 is used when the dirty cache line address data structure 250 is implemented in hardware, and the threshold value M' is used when the dirty cache line address data structure 250 is implemented in software (e.g., the dirty cache line address data structure 350 of FIGS. 3 and/or 4). As used herein, the capacity limit M and the threshold value M' may be used interchangeably to control the number of dirty cache line addresses that are tracked in the dirty cache line address data structure 250.

The example dirty cache line address data structures 250 of FIG. 2 may be a hash table or other suitable type of data structure implemented in hardware. In some examples, the dirty cache line address data structure 250 may be located in the cache 120 or any other suitable memory subsystem. In the illustrated example of FIG. 2, the dirty cache line address data structure 250 stores dirty cache line addresses (DIRTY_TAG$_j$) 252 (e.g., address values, physical locations, etc.). In some examples, the dirty cache line addresses (DIRTY_TAG$_j$) 252 correspond to ones of the cache line addresses (TAG$_i$) 126 (FIG. 1) that may be (or are) associated with dirty cache lines corresponding to locations in the non-volatile memory 150. In some such examples, the cache controller 110 uses the dirty cache line address data structure 250 to limit the number of dirty cache line addresses (DIRTY_TAG$_j$) 252 corresponding to locations in the non-volatile memory 150 to a quantity of M dirty cache lines. In such examples, the quantity of M dirty cache lines corresponds to the capacity limit M (or a threshold value M') of the dirty cache line address data structure 250. In some examples, the capacity limit M of the dirty cache line address data structure 250 is equal to the number of cache lines in a cache way of the cache 120. In the illustrated example, the dirty cache line addresses (DIRTY_TAG$_j$) 252 are indicated as corresponding to ones of the cache line addresses (TAG$_i$) 126 by having the same address values, by referring to a same virtual address, and/or by having some other similar mapping or association to a same address or location of a virtual memory space and/or a physical memory space.

In FIG. 2, the example event identifier 210 monitors data access events (e.g., read operations, write operations, etc.) performed in the cache 120. In some examples, the event identifier 210 monitors the cache 120 for store events. As used herein, a store event corresponds to a write event in which data (DATA$_i$) 128 in the cache 120 is modified and is to be written back to the volatile memory 140 and/or to the non-volatile memory 150. In the illustrated example, upon identification of a store event, the event identifier 210 notifies the non-volatile address filter 220 of the store event to analyze the location and/or address indicated in the store event. In the illustrated example, the non-volatile address filter 220, the cache line address locator 230, and the dirty address updater 240 use the analyzed location and/or address indicated in the store event to determine whether the store event requires an update to the dirty cache line address data structure 250. For example, the dirty address updater 240 determines if the store event indicates a new cache line address (TAG$_i$) 126 that is not currently being tracked (e.g., stored) in the dirty cache line address data structure 250. For example, if the cache line address (TAG$_i$) 126 indicated by the store event is not already stored (e.g., in a hash entry) in the dirty cache line address data structure 250, the indicated cache line address (TAG$_i$) 126 is not currently being tracked as a corresponding dirty cache line. In such instances, the dirty address updater 250 determines that it needs to track the cache line address (TAG$_i$) 126 by creating a new dirty cache line address (DIRTY_TAG$_j$) 252 corresponding to the indicated cache line address (TAG$_i$) 126. The dirty address updater 240 is also configured to determine when a dirty cache line address (DIRTY_TAG$_j$) 252 is to be removed from the dirty cache line address data structure 250 based on whether a flush of a dirty cache line 122 in the cache 120 is to occur.

The example non-volatile address filter 220 of FIG. 2 determines whether a store event corresponds to an address (and/or a location) in the volatile memory 140 and/or corresponds to an address (and/or a location) in the non-volatile memory 150. The cache line address locator 230 of the illustrated example determines cache line addresses (TAG$_i$) 126 corresponding to addresses indicated in store events. The example cache line address locator 230 provides the dirty address updater 240 with cache line address(es) (TAG$_i$) 126 corresponding to the store events.

The example dirty address updater 240 of FIG. 2 determines whether a cache line address (TAG$_i$) 126 associated with a store event is already stored as a dirty cache line address (DIRTY_TAG$_j$) 252 in the cache line address data structure 250. In this manner, the example dirty address updater 240 facilitates avoiding any unnecessary increases in the number of dirty cache line addresses (DIRTY_TAG$_j$) 252 with duplicate entries. Preventing duplicate entries keeps the dirty cache line address data structure 250 relatively compact and avoids performing multiple write backs to the non-volatile memory 150 for a same cache line address (TAG$_i$) 126 that could otherwise occur if the addresses were stored in duplicate in the dirty cache line address data structure 250. For example, when a store event modifies data (DATA$_1$) 128 corresponding to cache line address (TAG$_i$) 126, and when the modified data (DATA$_1$) 128 is to be written back to the non-volatile memory 150, the non-volatile address filter 220 determines if a dirty cache line address (DIRTY_TAG$_j$) 252 matches and/or corresponds to the cache line address (TAG$_i$) 126 (e.g., DIRTY_TAG$_2$ matches and/or corresponds to TAG$_i$) to determine if the cache line address (TAG$_i$) 126 is to be added to the dirty cache line address data structure 250 for tracking. If the cache line address (TAG$_i$) 126 of the example store event does not match one of the dirty cache line addresses (DIRTY_TAG$_j$) 252 (e.g., none of the dirty cache line addresses (DIRTY_TAG$_j$) 252 match or correspond to the example cache line address (TAG$_1$) 126), the dirty address updater 240 updates the dirty cache line address data structure 250 to include a new reference (e.g., a newly added dirty cache line address (DIRTY_TAG$_j$) 252) corresponding to the cache line address (TAG$_1$) 126 indicated in the store event. On the other hand, if one of the dirty cache line addresses (DIRTY_TAG$_j$) 252 does correspond to the cache line address (TAG$_1$) 126 indicated in the store event, the dirty address updater 240 does not update the dirty cache line address data structure 250 because the cache line address (TAG$_i$) 126 is already tracked as dirty in the dirty cache line address data structure 250. Thus, the cache controller 202 continues to track modified ones of the cache lines 122 without increasing the number of dirty cache line addresses (DIRTY_TAG$_j$) 252 toward the threshold that causes the flush indicator 260 to instruct the memory controller 132 or other flush controller to write back and/or clear corresponding data (DATA$_1$) 128 from the cache 120 corresponding to the cache line address (TAG$_i$) 126 indicated in the store event.

The example dirty address updater 240 updates the dirty cache line address data structure 250 by first determining if the dirty cache line address data structure 250 has reached a capacity limit of M (or threshold of M') dirty cache line addresses. If there is less than the capacity limit of M dirty cache line addresses in the dirty cache line address data structure 250, the dirty address updater 240 adds the cache line address (TAG$_i$) 126 corresponding to the store event to the dirty cache line address data structure 250 as disclosed above. If the number of dirty cache line addresses has reached the capacity limit of M dirty cache line addresses, the dirty address updater 240 determines one or more dirty cache line address(es) (DIRTY_TAG$_j$) 252 to be removed from the dirty cache line address data structure 250. In examples disclosed herein, when reference is made to removing a (DIRTY_TAG$_j$) 252 from the dirty cache line address data structure 250, such removal is done in connection with the cache controller 110 causing a write back of its corresponding cache line 122.

In some examples, the dirty cache line address data structure 250 is a hash table in which locations in the dirty cache line address data structure 250 are designated for a particular address or particular addresses. In such examples, no two cache line addresses can be tracked in a same location in the dirty cache line address data structure 250 at the same time. Accordingly, in such examples, the threshold for a corresponding store event is satisfied when the store event indicates a first dirty cache line address (DIRTY_TAG$_i$) 252 that is to be stored at a particular location of the hash table that is already storing a second dirty cache line address (DIRTY_TAG$_2$) 252 regardless of other locations being empty in the dirty cache line address data structure 250. In such examples, the threshold is satisfied for the corresponding store event because only one dirty cache line address can be stored in each storage location of a hash table (i.e., the dirty cache line address data structure 250). Accordingly, in such examples, the threshold is relative to a particular address indicated in the store event. Thus, once the example threshold is satisfied, a write back of a cache line address (TAG$_i$) 126 corresponding to the dirty cache line address (DIRTY_TAG$_j$) 252 that is removed from the dirty cache line address data structure 250 is written back to the non-volatile memory 150 (or main memory).

In the illustrated example, the capacity limit M (or the threshold M') is less than the cache line storage capacity N (i.e., M<N). That is, the cache controller 110 artificially suppresses or limits the number of dirty cache lines in the cache 120 to be less than the cache space that is available for storing dirty cache lines. In some examples, a threshold number of dirty cache lines may be user selected and/or automatically adjusted by the cache controller 110 and/or processor core 130 (FIG. 1) based on settings of the processor system 100 to a threshold value M'. For example, when the processor core 130 determines that cache flushes have become less frequent during a particular time period, the processor core 130 may increase the threshold number M' of dirty cache lines because the processor core 130 has extra time/resources to account for longer write back operations to the non-volatile memory 150.

In the illustrated example, the dirty address updater 240 may remove a dirty cache line address (DIRTY_TAG$_j$) 252 and cause a write back of its corresponding cache line 122 using any suitable type of hierarchical cache line removal technique. For example, the dirty address updater 240 may use a first-in, first-out (FIFO) approach in which the first dirty address that was added to the dirty cache line address data structure 250 is the first to be removed. As another example, the dirty address updater 240 may use a least-frequently used cache line removal approach, in which the cache line that is the least frequently used and/or accessed is removed from the dirty cache line address data structure 250. In yet another example, the dirty address updater 240 may use least recently used (LRU) cache line removal in which the cache line that has not been accessed in the longest amount of time is removed from the dirty cache line address data structure 250. Once the dirty cache line address (DIRTY_TAG$_j$) 252 corresponding to the determined cache line address (TAG$_i$) 126 is identified, the dirty address updater 240 removes the appropriate dirty cache line address (DIRTY_TAG$_j$) 252 and notifies the flush indicator 260 that the cache line 122 of the determined cache line address (TAG$_i$) 126 is to be written back to the non-volatile memory 150 and cleared from the cache 120 (i.e., flushed). The flush indicator 260 may then provide a flush instruction with the cache line address (TAG$_i$) 126 to the memory controller 132 of the processor core 130 or other cache flush controller to flush the corresponding cache line 122.

While an example hardware representation of implementing the cache controller 110 of FIG. 1 is illustrated as the example cache controller 202 of FIG. 2, one or more of the elements, processes and/or devices of the example cache controller 202 illustrated in FIG. 2 may be combined, divided, re-arranged, omitted, eliminated and/or implemented in any other way. Further, although the example cache controller 202 of FIG. 2 is implemented via hardware, the example event identifier 210, the example non-volatile address filter 220, the example cache line address locator 230, the example dirty address updater 240, the example dirty cache line address data structure 250, and the example flush indicator 260 and/or, more generally, the example cache controller 202 of FIG. 2 may be implemented by hardware, software, firmware and/or any combination of hardware, software and/or firmware. Thus, for example, any of the example event identifier 210, the example non-volatile address filter 220, the example cache line address locator 230, the example dirty address updater 240, the example dirty cache line address data structure 250, and the example flush indicator 260 and/or, more generally, the example cache controller 202 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event identifier 210, the example non-volatile address filter 220, the example cache line address locator 230, the example dirty address updater 240, the example dirty cache line address data structure 250, and/or the example flush indicator 260 is/are hereby expressly defined to include a tangible computer readable storage device or storage disk such as a memory, a digital versatile disk (DVD), a compact disk (CD), a Blu-ray disk, etc. storing the software and/or firmware. Further still, the example cache controller 202 of FIG. 2 may include one or more elements, processes and/or devices in addition to, or instead of, those illustrated in FIG. 2, and/or may include more than one of any or all of the illustrated elements, processes and devices.

FIG. 3 is a block diagram showing an example software representation of an example dirty address updater 340 and a software representation of an example dirty cache line address data structure 350 in communication with another example hardware representation of a cache controller 302. In the illustrated example of FIG. 3, the cache controller 302 is used to implement the cache controller 110 of FIG. 1. The example cache controller 302 of the illustrated example of FIG. 3 includes an example event identifier 210, an example non-volatile address filter 220, an example cache line address locator 230, and an example flush indicator 260. In the illustrated example of FIG. 3, the example cache controller 302 is implemented using hardware. For example, the example event identifier 210, the example non-volatile address filter 220, the example cache line address locator 230, the example flush indicator 260, and/or more generally, the example cache controller 302 can be implemented by one or more integrated circuits, logic circuits, microprocessors or controllers from any desired family or manufacturer.

The example cache controller 302 of FIG. 3 controls the cache 120 of FIG. 1 using the example dirty address updater 340 and the example dirty cache line address data structure 350 of FIG. 3. In the illustrated example, the dirty address updater 340 and the dirty cache line address data structure 350 are implemented using software and/or firmware. Accordingly, the example dirty address updater 340 and/or the example dirty cache line address data structure 350 of FIG. 3 are implemented using instructions stored on a storage device or storage disc, such as, the non-volatile memory 150 and/or the mass storage device 190 of FIG. 1.

In the illustrated example of FIG. 3, the example cache controller 302, the example dirty address updater 340, and the dirty cache line address data structure 350 perform similar operations and/or have similar functionality as the cache controller 202 of FIG. 2. For example, the event identifier 210 performs similar operations and/or has similar functionality as the event identifier 210 of FIG. 2, the example non-volatile memory address 220 performs similar operations and/or has similar functionality as the example non-volatile memory address 220 of FIG. 2, the example cache line address locator 230 performs similar operations and/or has similar functionality as the cache line address locator 230 of FIG. 2, and/or the flush indicator 260 performs similar operations and/or has similar functionality as the flush indicator 260 of FIG. 2. In a similar manner, even though the example dirty address updater 340 of FIG. 3 and the example dirty cache line address database 350 of FIG. 3 are implemented using software and/or firmware, the example dirty address updater 340 performs similar operations and/or has similar functionality as the example address updater 240 of FIG. 2, and the example dirty cache line address data structure 350 performs similar operations and/or has similar functionality as the dirty cache line address data structure 250. In the interest of brevity, details of the example event identifier 210, the example non-volatile address filter 220, the example cache line address locator 230, the example flush indicator 260, the example dirty address updater 340, and the example dirty cache line address data structure 350 are not repeated here. Instead, the interested reader is referred to the above descriptions of the example event identifier 210, the example non-volatile address filter 220, the example cache line address locator 230, the example flush indicator 260, the example dirty address updater 240, and the example dirty cache line address data structure 250 of FIG. 2 for relevant details.

As disclosed herein, the dirty address updater 340 and the dirty cache line address data structure 350 of FIG. 3 are implemented in software and/or firmware. Accordingly, the example dirty address updater 340 and/or the example dirty cache line address data structure 350 may be compiled ahead-of-time prior to runtime to define a software/firmware function that facilitates tracking dirty cache lines. In such examples, an instruction may be created so that a program can call into the function to track dirty cache lines. For purposes of this disclosure and ease of reference in the following, such instruction is referred to as a store_with_tracking instruction. Example operations that may be used to implement the store_with_tracking instruction are described below in connection with FIG. 5. The following is example pseudo code of an example store_with_tracking instruction that may be executed to perform the operations disclosed herein.

```
[LOC1]  store_with_tracking(addr, value)
        {
[LOC2]  cache_line_addr = high_order_bits (addr);
[LOC3]  h = hash(cache_line_addr) mod <length of may_be_dirty array>;
[LOC4]  if (may_be_dirty[h] !=0 && may_be_dirty[h] != cache_line_addr)
[LOC5]      asynchronously_flush_cache_line(may_be_dirty[h]);
[LOC6]  may_be_dirty[h] = cache_line_addr;
[LOC7]  *addr = value;
        }
```

Line of code [LOC 1] of the above example pseudo code is called each time store_with_tracking instruction is called. At line of code [LOC2] of the above example pseudo code, a variable cache_line_addr is set to the cache line address of the cache line, and bits corresponding to the byte addresses within the cache line are ignored or masked using a high_order_bits function. At line of code [LOC3], a variable h is set to a hash value of the cache line address. At line of code [LOC4], a may_be_dirty array (e.g., the dirty cache line address data structure 250, 350 of FIGS. 2 and 3) is checked to determine if the cache line address is already located in the may_be_dirty array (e.g., the dirty cache line address data structure 250, 350 of FIGS. 2 and 3) by determining that the hash entry is not equal to 0 and the hash entry is not equal to the cache line address. At line of code [LOC5] if cache_line_addr is not in may_be_dirty and the entry at h is not equal to zero, the cache line at entry h is flushed asynchronously relative to other scheduled flush operations. At line of code [LOC6], the may_be_dirty array (e.g., the dirty cache line address data structure 250, 350 of FIGS. 2 and 3) is updated (same value may be rewritten at entry h if address was already in the may_be_dirty array). At line of code [LOC7] the store operation is performed.

In the illustrated example of FIG. 3, the store_with_tracking instruction is exposed or made available to software developers that want to take advantage of enhanced caching operations disclosed herein. Accordingly, when such example software developers desire to take advantage of the disclosed enhanced caching operations, the software developers recompile their legacy programs to replace standard store instructions with the new store_with_tracking instruction disclosed herein. In such examples, the cache controller 302, the dirty address updater 340 and the dirty cache line address data structure 350 are used to implement the operations necessary to execute the store_with_tracking instructions rather than standard store instructions during execution of the recompiled programs. Upon execution of the store_with_tracking instructions, the example cache controller 302, the example dirty address updater 340, and the example dirty address updater 350 perform operations disclosed herein to track dirty cache lines and limit the number of dirty cache lines that store data corresponding to the non-volatile memory 150.

While an example hardware representation of implementing the cache controller 110 of FIG. 1 using the cache controller 302 and example software-based implementations of the example dirty address updater 340 and the example dirty cache line address data structure 350 are illustrated in FIG. 3, one or more of the elements, processes and/or devices of the example cache controller 302, the example dirty address updater 340, and/or the dirty cache line address data structure 350 illustrated in FIG. 3 may be combined, divided, re-arranged, omitted, eliminated and/or implemented in any other way. Further, although the example cache controller 302 is implemented in hardware, the example event identifier 210, the example non-volatile address filter 220, the example cache line address locator 230, the example and the example flush indicator 260 and/or, more generally, the example cache controller 302 of FIG. 3, as well as the example dirty address updater 340 and/or the dirty cache line address data structure 350 may be implemented by hardware, software, firmware and/or any combination of hardware, software and/or firmware. Thus, for example, any of the example event identifier 210, the example non-volatile address filter 220, the example cache line address locator 230, and the example flush indicator 260 and/or, more generally, the example cache controller 302, as well as, the example dirty address updater 340 and/or the dirty cache line address data structure 350, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event identifier 210, the example non-volatile address filter 220, the example cache line address locator 230, the example dirty address updater 340, the example dirty cache line address data structure 350, and/or the example flush indicator 260 is/are hereby expressly defined to include a tangible computer readable storage device or storage disk such as a memory, a digital versatile disk (DVD), a compact disk (CD), a Blu-ray disk, etc. storing the software and/or firmware. Further still, the example cache controller 302, the example dirty address updater 340, and/or the example dirty cache line address data structure 350 of FIG. 3 may include one or more elements, processes and/or devices in addition to, or instead of, those illustrated in FIG. 3, and/or may include more than one of any or all of the illustrated elements, processes and devices.

Example methods, apparatus, and articles of manufacture disclosed herein allow managing cache as disclosed herein without recompiling legacy software programs. Such examples involve mapping a read-only memory address space and a writable memory address space, and when a store event corresponds to the read-only memory address space, the store instruction can be replaced by alternate code that performs a store operation at a memory location corresponding to the writable memory address space.

FIG. 4 is a block diagram of an example instruction trapper 420 implemented using software and/or firmware to implement example cache control techniques disclosed herein. In the illustrated example, the instruction trapper 420 is in communication with an example hardware-based cache controller 402, which may be used to implement the cache controller 110 of FIG. 1. The example of FIG. 4 also includes an example software-based dirty address updater 340 and an example software-based dirty cache line address data structure 350, and an example software based code modifier 452. The example cache controller 402 of the illustrated example of FIG. 4 includes an example event identifier 210, an example cache line address locator 230, and an example flush indicator 260. In the illustrated example, the example event identifier 210, the example cache line address locator 230, the example flush indicator 260, and/or more generally, the example cache controller 402 can be implemented by one or more integrated circuits, logic circuits, microprocessors or controllers from any desired family or manufacturer.

The example cache controller 402 of FIG. 4 controls the cache 120 of FIG. 1 using the example instruction trapper 420, the example dirty address updater 340, and the example dirty cache line address data structure 350 of FIG. 4. The dirty address updater 340 and the dirty cache line address data structure 350 are implemented via software and/or firmware. Accordingly, the example instruction trapper 420, the example dirty address updater 340 and/or the dirty cache line address data structure 350 of FIG. 4 are implemented via instructions stored on a storage device or storage disc, such as, the non-volatile memory 150 and/or the mass storage device 190 of FIG. 1.

In the illustrated example of FIG. 4, the example cache controller 402, the example dirty address updater 340, and the dirty cache line address data structure 350 perform similar operations and/or have similar functionality as the cache controller 202 of FIG. 2. For example, the event identifier 210 performs similar operations and/or has similar functionality as the event identifier 210 of FIG. 2, the example cache line address locator 230 performs similar operations and/or has similar functionality as the cache line address locator 230 of FIG. 2, and/or the flush indicator 260 performs similar operations and/or has similar functionality as the flush indicator 260 of FIG. 2. In a similar manner, even though the example dirty address updater 340 of FIG. 4 and the example dirty cache line address data structure 350 of FIG. 4 are implemented using software and/or firmware, the example dirty address updater 340 performs similar operations and/or has similar functionality as the example address updater 240 of FIG. 2, and the example dirty cache line address data structure 350 performs similar operations and/or has similar functionality as the dirty cache line address data structure 250 of FIG. 2. In the interest of brevity, details of the example event identifier 210, the example cache line address locator 230, the example flush indicator 260, the example dirty address updater 340, and the example dirty cache line address data structure 350 are not repeated here. Instead, the interested reader is referred to the above descriptions of the example event identifier 210, the example cache line address locator 230, the example flush indicator 260, the example dirty address updater 240, and the example dirty cache line address data structure 250 of FIG. 2 for relevant details.

The illustrated example of FIG. 4 may be used to provide software developers with access to the enhanced cache controlling techniques disclosed herein without requiring such software developers to recompile their legacy software to explicitly use any special instructions (e.g., a store_with_tracking instruction) that invoke the disclosed cache control techniques. That is, the software-based examples disclosed in connection with FIG. 4 enable legacy software programs 490 or software programs with standard 'store' instructions to advantageously use the store_with_tracking instruction without needing a software developer and/or an ahead-of-time software compiler to explicitly include the store_with_tracking instruction in programs. In such examples, the instruction trapper 420 of FIG. 4 performs a trapping technique to trap normal store operations to perform the store_with_tracking operations disclosed herein. Accordingly, in such examples, a software program 456 having standard store instructions can operate using enhanced cache performance using techniques disclosed herein when the instruction trapper 420 traps store events and replaces corresponding store instructions with new store_with_tracking instructions in the software program 456. For example, the example code modifier 452 modifies and replaces a store instruction during runtime with a store_with_tracking instruction so that operations of the store_with_tracking instruction provide the program with enhanced cache performance as disclosed herein. In some examples, the replacement of the store instruction with the store_with_ tracking instruction may be made in the binary code of a program executing in an operating system environment of the processor system 100.

FIG. 4 illustrates an example representation of an instruction trapper 420 implemented in software and/or firmware to determine when a store event is to be replaced with a store_with_tracking operation as disclosed herein. In the illustrated example, the instruction trapper 420 identifies store events corresponding to the non-volatile memory 150 using a trapping technique. In the illustrated example of FIG. 4, the instruction trapper 420 includes an example address mapper 260, an example trap identifier 470, and an example trap handler 480. The example instruction trapper 420 of FIG. 4 uses the example address mapper 465 to trap stores (e.g., via write fault detection) to a read-only address of the read-only mapping 490 of data from the non-volatile memory 150 to determine that an address (i.e., the read-only address) indicated in a store event is in the non-volatile memory 150. In addition, the instruction trapper 420 tracks a writable address and/or location in a writable mapping 492 that corresponds to the read-only address of the read-only mapping 490 by identifying the writable address in the writable mapping 492 that is to be tracked by the cache controller 402 as disclosed herein.

In the illustrated example of FIG. 4, the address mapper 465 maps data of the example non-volatile memory 150 to a virtual address space in hardware, software, firmware, etc. For example, the processor core 130 may identify corresponding addresses of data in the non-volatile memory 150 via the address mapper 465 by identifying an address and/or location in the address mapper 465 that points to an address and/or location of the corresponding data in the non-volatile memory 150. The example address mapper 465 maintains the read-only mapping 490 of the data that is stored in the non-volatile memory 150 in a read-only memory address space or a read-only virtual address space and the writable mapping 492 of the data that is stored in non-volatile memory 150 in a writable memory address space or writable virtual address space. The read-only mapping 490 is read-only in that only read operations are allowed for the data in the non-volatile memory 150 that is represented in the read-only mapping 490. The writable mapping 492 is writable in that write operations are allowed to data in the non-volatile memory 150 that is represented in the writable mapping 492.

The example address mapper 465 of FIG. 4 is implemented using software and/or firmware (e.g., as a client address space) stored in the processor system 100 (e.g., in a virtual address space in software, firmware, etc.). For example, instructions to implement the address mapper 465 may be stored in the non-volatile memory 150, or in any other storage device. In the illustrated example, the read-only mapping 490 of the non-volatile memory 150 is the only mapping of the non-volatile memory 150 that is directly accessed by the legacy software on processor core 130 (e.g., by client code executing via the processor core 130). That is, the processor core 130 initially does not access the writable mapping 492. Accordingly, the processor core 130, when executing a store event, attempts to write to the read-only mapping 490 because it is the only mapping of the non-volatile memory 150 that is used by software on processor core 130. Thus, when an event (e.g., a store event) includes an attempt to write data to a location in the read-only mapping 490 (e.g., the location (X) 494), a trap (e.g., a write fault error) is triggered because the processor 130 cannot write to data represented in the read-only mapping (because it is read-only). Based on the trap identifier 470 identifying a trap, the instruction trapper 420 determines that the address indicated in the store event is in the non-volatile memory 150. Because attempting to write to a data location represented in the read-only mapping 490 causes a trap or exception due to its read-only attribute, the instruction trapper 420 uses the trap or exception to facilitate identification of a corresponding location (e.g., the location (X+D) 496) in the writable mapping 492 through which the data can be updated in the non-volatile memory 150. The address and/or location of the writable mapping 492 is then tracked via a store_with_tracking operation by the cache controller 402 as disclosed herein as a dirty cache line address (DIRTY_TAG$_j$) 352. To facilitate a store_with_tracking in accordance with FIG. 4, the example instruction trapper 420 provides the storage location in the writable mapping 492 to the code modifier 452. The code modifier 452 generates a store_with_tracking instruction and replaces, in the software program 456, a store instruction that caused the trapped store event. In the illustrated example, the code modifier 452 replaces the store instruction with the store_with_tracking instruction in a portion of RAM (e.g., the volatile memory 140) in which the software program 456 is loaded during runtime.

In the illustrated example of FIG. 4, the read-only mapping 490 of the data in the non-volatile memory 150 corresponds to addresses and/or locations of the data in the non-volatile memory 150. In the illustrated example, the address mapper 465 generates and/or stores the writable mapping 492 at an example offset (D) 498 (e.g., a number of addresses, physical locations, etc.) from the read-only mapping 490. For example, a read-only address (X) 494 (e.g., a pointer address) in the read-only mapping 490 may correspond to a writable address (X+D) 496 in the writable mapping 492, in which the offset (D) 498 is the offset value and the addresses (X) 494 and (X+D) 496 are addresses in the address mapper 465. In such examples, the data at the read-only address (X) 494 is the same as the data at the writable address (X+D) 496 (e.g., the data at writable address (X+D) 496 is a copy of the data at read-only address (X) 494). In such examples, using the offset (D) 498 aids the instruction trapper 420 in relatively quickly identifying the location (X+D) 496 in the writable mapping 492 that corresponds to the location (X) 494 of the read-only mapping 490 to which the processor core 130 attempted to perform a write operation.

In response to identifying a trap at a location (e.g., the read-only address (X) 494) in the read-only mapping 490, the example trap identifier 470 of FIG. 4, instructs the trap handler 480 to generate a special instruction (e.g., a store_with_tracking instruction indicating the writable address (X+D) 496) to track store events to the corresponding location in the writable mapping 492. In the illustrated example, the example trap handler 480 provides the store_with_tracking instruction to the code modifier 452. The code modifier 452 replaces the original store instruction in the software program 456 (e.g., the instruction in the binary code of the software program 456 that caused the trapped store event) with the store_with_tracking instruction to track the address of the writable mapping 492.

The example trapping technique implemented via the instruction trapper 420 as disclosed herein enables the cache controller 402 to determine which addresses indicated in store events are to be tracked in the dirty cache line address data structure 350 by identifying an attempt to write data to the read-only mapping 490 of the non-volatile memory 150. When the code modifier 452 replaces a legacy store instruction with a new store_with_tracking instruction, when the same store_with_tracking instruction is encountered again during execution of the software program 452 (e.g., during multiple iterations of a loop), a trap will not be triggered because the store_with_tracking instruction corresponds to the writable mapping address (X+D) 496 in the writable mapping 492, which does not trigger a trap.

Accordingly, in the illustrated example of FIG. 4, the example trap handler 480 determines the location (e.g., the writable address (X+D) 496) in the writable mapping 492 that is to be tracked in the dirty cache line address data structure 350 in the event of a trap. The trap handler 480 provides the storage location (e.g., the writable address (X+D) 496) of the writable mapping 492 to the cache line address locator 230 and/or the dirty address updater 340 of FIG. 4 for tracking as disclosed herein. Thus, in such examples, the instruction trapper 420 of FIG. 4 identifies store events indicating addresses in the non-volatile memory 150 and replaces corresponding store instructions with store_with_tracking instructions.

Although FIG. 4 is representative of an example manner of implementing the instruction trapper 420 using software and/or firmware, the instruction trapper 420 may be implemented using any other suitable techniques including software, firmware, and/or hardware.

While an example hardware-based implementation of implementing 110 of FIG. 1 using the cache controller 402 of FIG. 4 and example software-based implementations of the example instruction trapper 420, the example dirty address updater 340 and the example dirty cache line address data structure 350 are illustrated in FIG. 4, one or more of the elements, processes and/or devices illustrated in FIG. 4 may be combined, divided, re-arranged, omitted, eliminated and/or implemented in any other way. Further, although the example cache controller 402 is implemented in hardware, the example event identifier 210, the example cache line address locator 230, the example flush indicator 260, and/or more generally the example cache controller 402, as well as the, the dirty address updater 340, the dirty cache line address data structure 350, and the example code modifier 452, the example address mapper 465, the example trap identifier 470, the example trap handler 480, the example read-only mapping 490, the example writable mapping 492 and/or, more generally, the example instruction trapper 420 of FIG. 4 may be implemented by hardware, software, firmware and/or any combination of hardware, software and/or firmware. Thus, for example, any of the example event identifier 210, the example cache line address locator 230, the example flush indicator 260, and/or more generally the example cache controller 402, as well as the, the dirty address updater 340, the dirty cache line address data structure 350, and the example code modifier 452, the example address mapper 465, the example trap identifier 470, the example trap handler 480, the example read-only mapping 490, the example writable mapping 492 and/or, more generally, the example instruction trapper 420 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event identifier 210, the example cache line address locator 230, the example code modifier 452, the example flush indicator 260, the example dirty address updater 340, the example dirty cache line address data structure 350, the example address mapper 465, the example trap identifier 470, the example trap handler 480, the example read-only mapping 490, and/or the example writable mapping 492 is/are hereby expressly defined to include a tangible computer readable storage device or storage disk such as a memory, a digital versatile disk (DVD), a compact disk (CD), a Blu-ray disk, etc. storing the software and/or firmware. Further still, the example cache controller 402, the example dirty address updater 340, the example dirty cache line address data structure 350 and/or the example instruction trapper 420 of FIG. 4 may include one or more elements, processes and/or devices in addition to, or instead of, those illustrated in FIG. 3, and/or may include more than one of any or all of the illustrated elements, processes and devices.

In examples disclosed herein, the cache controller 110 of FIG. 1 (e.g., implemented by one of the cache controllers 202, 302, 402 of FIGS. 2, 3, and/or 4) uses an example cache line address data structure (e.g., one of the cache line address data structures 250, 350 of FIGS. 2, 3, and/or 4) for efficient cache control by avoiding potentially unnecessary cache line flushes. For example, instead of writing back a cache line to the volatile memory 140 and/or the non-volatile memory 150 each time the cache line is made dirty (e.g., the data stored therein is modified), the example cache line address data structure tracks multiple modifications to the cache lines 122 so that the data ($DATA_j$) 128 in the cache lines 122 can be modified multiple times in the cache 120 when they are already dirty without having to perform multiple write backs for each modification when a dirty cache line, which has yet to be written back, is further modified.

Example methods, apparatus, and articles of manufacture disclosed herein enable the cache controllers 110 (implemented by one or more of the cache controllers, 202, 302, 402 of FIGS. 2, 3, and/or 4) to facilitate a full flush (i.e., a write back and/or clear/removal) of all dirty cache lines in the cache 120 of FIG. 1. In examples disclosed herein, an example event identifier (e.g., one of the event identifier 210 of FIGS. 2, 3, and/or 4) of the cache controller 110 identifies a request to flush all cache lines 122 (e.g., those cache lines corresponding to the non-volatile memory 150) in the cache 120 that are dirty. In such examples, the cache controller 110 identifies the cache lines 122 in the cache 120 that are dirty using an example dirty cache line address (e.g., one of the dirty cache line address data structures 250, 350 of FIGS. 2, 3, and/or 4). An example dirty address updater (e.g., one of the dirty address updaters 240, 340 of FIGS. 2, 3, and/or 4) provides the dirty cache line addresses ($DIRTY\_TAG_j$) 252, 352 to the memory controller 132 and/or to any other cache flush controller, and all cache lines 122 corresponding to the dirty cache line addresses ($DIRTY\_TAG_j$) 252, 352 are written back to the non-volatile memory 150 and, in some examples, cleared. Accordingly, rather than flushing the entire contents of the cache 120, only the dirty ones of the cache lines 122 are flushed, ensuring that the data that has yet to be modified in the non-volatile memory 150 gets updated with corresponding dirty cache lines. In such examples, a flush of the cache 120 involves flushing a number of dirty cache lines limited to the capacity limit of M dirty cache lines in the example dirty cache line address data structure. Because the number of dirty cache lines is limited by the cache controller 110, a flush of the cache 120 in FIG. 1 as disclosed herein is faster than a full flush of the cache 120, in which potentially every cache line 122 of the cache 120 is to be flushed, if all cache lines 122 in the entire capacity of the cache 120 are dirty.

The following is example pseudo code of an example of a full flush function that may be executed to perform a full flush operation of all the dirty cache lines in the cache 120.

```
[LOC1]    flush_all( )
          {
[LOC2]        for (i=0; i< N; ++1) {
[LOC3]            if (may_be_dirty[i] !=0) {
[LOC4]                asynchronously_flush_cache_line(may_be_dirty[i]);
[LOC5]                may_be_dirty[i] = 0;
                  }
              }
[LOC6]        wait_for_all_asynchronous_flushes_to_complete( );
          }
```

Line of code [LOC1] of the above example pseudo code specifies the example name of the full flush function. At lines of code [LOC2], [LOC3], and [LOC4], the pseudo code flushes all cache lines corresponding to entries in the may_be_dirty array (e.g., the dirty cache line address data structure 250, 350 of FIGS. 2 and 3) that are non-zero asynchronously relative to other flushes. At line of code [LOC5], the may_be_dirty array (e.g., the dirty cache line address data structure 250, 350 of FIGS. 2 and 3) is cleared (i.e., zeroed out) to ensure that a second flush of the cache is not initiated. At line of code [LOC6], the system waits until all lines of code have been flushed.

Example methods, apparatus, and articles of manufacture disclosed herein enable the cache controller 110 of FIG. 1 (implemented by one or more of the cache controllers, 202, 302, 402 of FIGS. 2, 3, and/or 4) to facilitate flushing of dirty cache lines as a background process. In some examples, the cache controller 110 may determine, via an example event identifier (e.g., one of the event identifiers 210 of FIGS. 2, 3, and/or 4) when the processor core 130 has available resources to perform a flush of one or more dirty cache lines identified by an example dirty cache line address data structure (e.g., one of the dirty cache line address data structures 250, 350 of FIGS. 2, 3, and/or 4). In such examples, the cache controller 110 may determine which of the cache lines 122 in the cache 120 are to be flushed based on any type of hierarchical cache line removal technique. For example, the cache controller 110 may determine that a cache line is to be flushed based on a FIFO approach, a least frequently used approach, and/or an oldest accessed cache line approach. Such example methods allow the cache controller 110 to efficiently limit the number of cache lines 122 in the cache 120 that are dirty and/or correspond to the non-volatile memory 150 while preserving the processing efficiency of the processor core 130. In such examples, the background process to flush one or more dirty cache lines in the cache 120 is performed without being based on a store event (e.g., a store event that would cause a new dirty cache line address (e.g., one of the dirty cache line addresses (DIRTY_TAG$_j$) 252, 352) to be tracked in the example dirty cache line address data structure.

Figure 5:
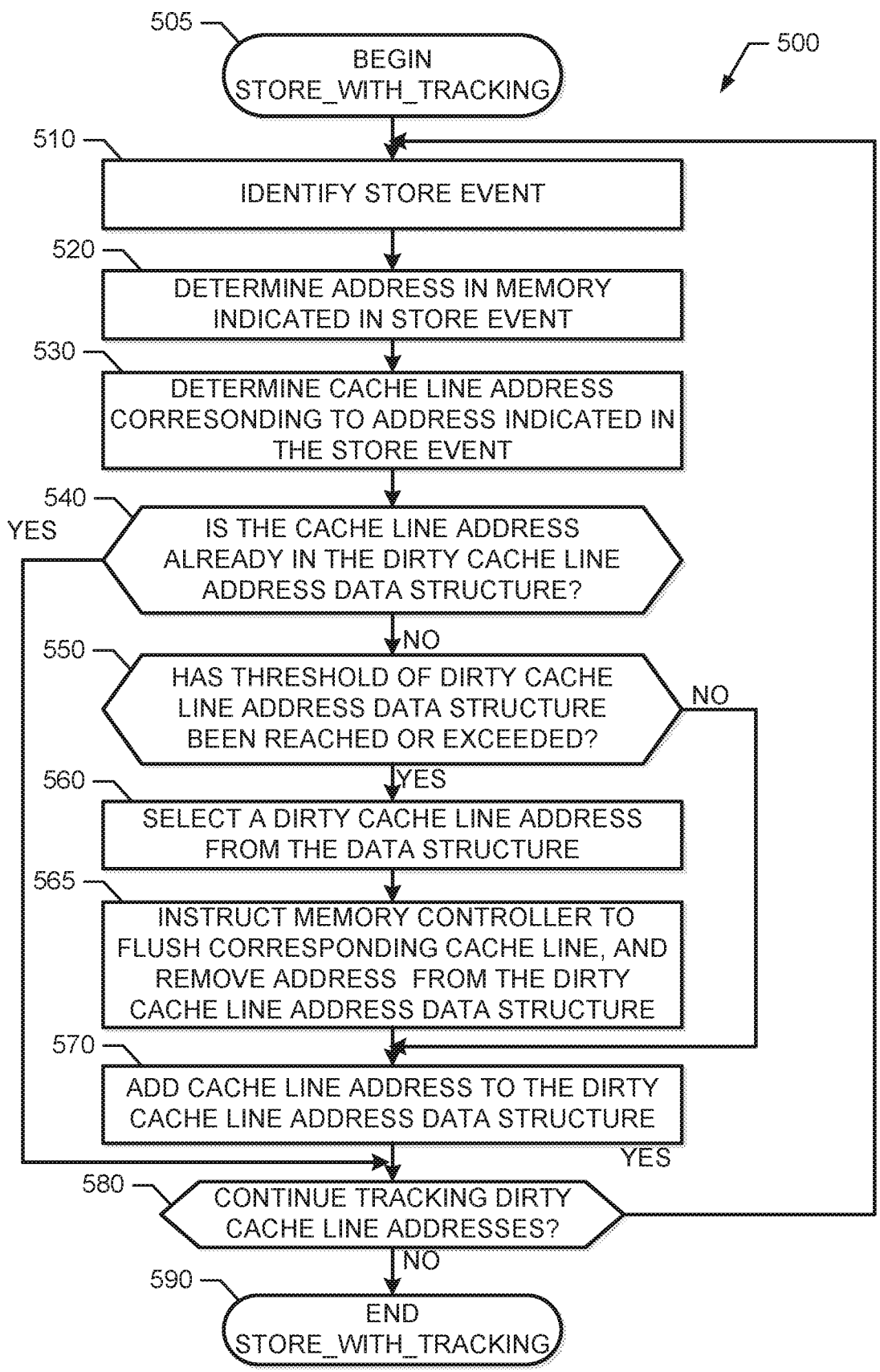
FIG. 5 is a flowchart representative of example machine readable instructions that may be executed to implement the example cache controller of FIG. 2 and/or the example cache controller and/or the example dirty address updater of FIG. 3.
Figure 6:
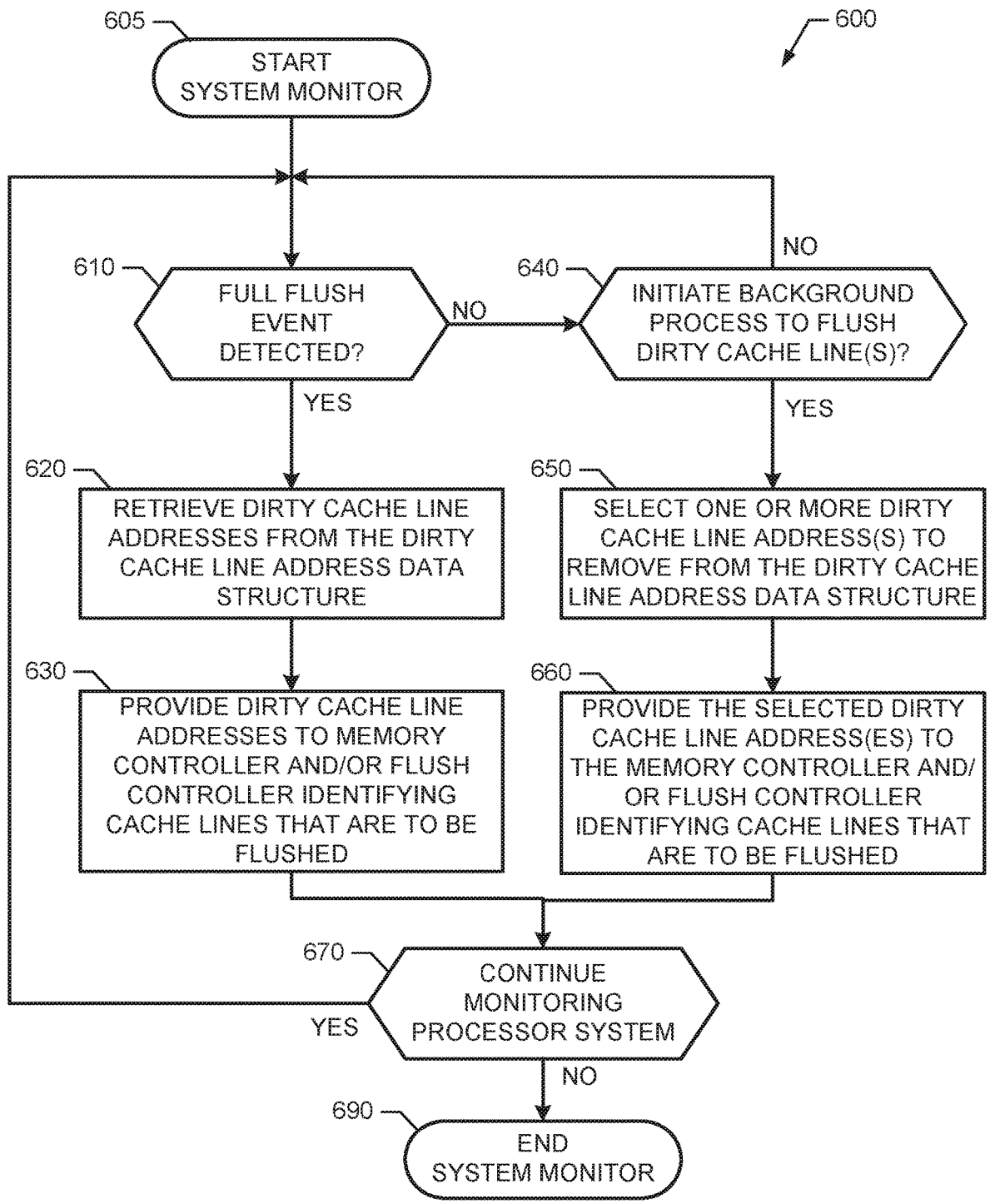
FIG. 6 is a flowchart representative of example machine readable instructions that may be executed to implement the example cache controller of FIG. 2 and/or the example cache controller and the example dirty address updater of FIGS. 3 and/or 4.

Flowcharts representative of example machine readable instructions for implementing the cache controller 202, 302, and/or 402 of FIGS. 2, 3, and/or 4 are shown in FIGS. 5 and 6. In this example, the machine readable instructions comprise processes for execution by a processor such as the processor core 130 shown in the example processor platform 100 discussed above in connection with FIG. 1. The processes may be embodied in software stored on a tangible computer readable storage medium such as a CD-ROM, a floppy disk, a hard drive, a digital versatile disk (DVD), a Blu-ray disk, or a memory associated with the processor core 130, but the entirety and/or parts of the processes thereof could alternatively be executed by a device other than the processor core 130 and/or embodied in firmware or dedicated hardware. Further, although the example processes are described with reference to the flowcharts illustrated in FIGS. 5 and/or 6, many other methods of implementing the example cache controller 202, 302, and/or 402 may alternatively be used. For example, the order of execution of the blocks may be changed, and/or some of the blocks described may be changed, eliminated, or combined.

The process 500 of FIG. 5 begins with an initiation of the processor system 100 of FIG. 1 and/or an initiation of the cache controller 202, 302, 402 of FIGS. 2, 3, and/or 4 to implement the cache controller 110 of FIG. 1 to track dirty cache lines corresponding to the non-volatile memory 150 (block 505). The example process 500 may be executed to control the number of dirty cache lines in the cache 120 allocated to the non-volatile memory 150.

At block 510 of the illustrated example, the example event identifier 210 identifies a store event. Upon receiving instructions from the event identifier 210, at block 520 the example non-volatile address filter 220 determines an address in memory indicated in the store event to determine an address in memory (e.g., the volatile memory 140 and/or the non-volatile memory 150 of FIG. 1) to which data is to be stored. At block 530, the cache line address locator 230 determines a cache line address (TAG$_i$) 126 corresponding to the address indicated in the store event.

At block 540, the dirty address updater 240, 340 determines whether the cache line address (TAG$_i$) 126 corresponding to the address indicated in the store event address is already being tracked in the dirty cache line address data structure 250, 350 (e.g., a cache line address (TAG$_i$) 126 of FIG. 1 corresponds to one of the dirty cache line addresses (DIRTY_TAG$_j$) 252, 352 of FIGS. 2, 3, and/or 4). If the dirty address updater 240, 340 determines at block 540 that the cache line address (TAG$_i$) 126 is in the dirty cache line address data structure 250, 350 (or corresponds to a dirty cache line address (DIRTY_TAG$_j$) 252, 352), control advances to block 580. In such examples, the dirty address updater 240, 340 does not perform an update (e.g., add a dirty cache line address (DIRTY_TAG$_j$) 252) to the dirty cache line address data structure 250, 350 because the cache line address (TAG$_i$) 126 indicated in the store event is already being tracked in the dirty cache line address data structure 250, 350. In such examples, the cache line address (TAG$_i$) 126 may still be tracked in the dirty cache line address data structure 250, 350 because the cache line address has yet to be flushed from a previous modification to the data of the cache line. In such examples, the cache controller 110 avoids unnecessarily flushing a cache line 122 multiple times for multiple modifications. If the cache line address (TAG$_i$) 126 is not being tracked in the dirty cache line address data structure 250, 350, control advances to block 550.

At block 550 of FIG. 5, the dirty address updater 240, 340 determines whether the capacity limit M (or a threshold M') of the dirty cache line address data structure 250, 350 has been reached or exceeded. For example, the dirty address updater 240, 340 determines whether there are M dirty cache line addresses (DIRTY_TAG$_j$) 252, 352 in the dirty cache line address data structure 250, 350. When the dirty address updater 240, 340 determines that the capacity limit M of the dirty cache line address data structure 250, 350 has not been reached or exceeded, control advances to block 570.

When the dirty address updater 240, 340 determines that the capacity limit M of the dirty cache line address data structure 250, 350 has been reached or exceeded, at block 560, the address updater 240, 340 selects a dirty cache line 122 corresponding to a dirty cache line address (DIRTY_TAG$_j$) 252, 352 from the dirty cache line address data structure 250, 350 to be written back to the non-volatile memory 150. At block 565, the cache controller 110 instructs the memory controller 132 and/or processor core 130 to flush the dirty cache line of the dirty cache line address and remove the dirty cache line address from the dirty cache line address data structure 250, 350. For example, at block 565, the cache controller 110 may instruct the memory controller 132 and/or processor core 130 to write back the data (DATA$_i$) 128 of the cache line address (TAG$_i$) 126 corresponding to the selected dirty cache line address (DIRTY_TAG$_j$) 252, 352 to the non-volatile memory 150. In some examples, the cache controller 110 facilitates the write back and clear of the dirty cache line from the cache 120. The address updater 240, 340 removes the selected dirty cache line address (DIRTY_TAG$_j$) 252, 352 from the dirty cache line address data structure 250, 350. After the selected dirty cache line address (DIRTY_TAG$_j$) 252, 352 has been removed from the dirty cache line address data structure 250, 350, the dirty address updater 240, 340 adds the cache line address (TAG$_i$) 126 corresponding to the store event address to the dirty cache line address data structure 250, 350.

At block 580, the cache controller 110 determines whether to continue tracking dirty cache line addresses corresponding to the non-volatile memory 150. If the cache controller 110 is to continue to track dirty cache line addresses using the dirty cache line addresses (DIRTY_TAG$_j$) 252, 352 (e.g., to continue to limit the quantity of cache lines allocated for the non-volatile memory 150), control returns to block 510. If the cache controller 110 is no longer to continue tracking dirty cache line addresses (DIRTY_TAG$_j$) 252, 352 (e.g., due to a removal of power, a system failure, a change in cache control, etc.) the process 500 ends (block 590).

The process 600 of FIG. 6 begins with an initiation of the processor system 100 of FIG. 1 and/or an initiation of the cache controller 110 (which may be implemented using the cache controllers 202, 302, and/or 402 of FIGS. 2, 3, and/or 4) to monitor the processor system 100 (block 605). The example process 600 of FIG. 6 may be executed in parallel or in seriatim with the process 500 of FIG. 5. In some examples, the example process 600 may be executed to provide the memory controller 132 and/or any other flush controller all dirty cache line addresses (DIRTY_TAG$_j$) 252, 352 of dirty cache lines in the cache 120 that are to be written back to the non-volatile memory 150 and/or cleared from the cache 120. In some examples, the process 600 may be performed in response to a cache flush command during normal system operation, and/or a cache flush command arising from a system failure and/or removal of power from the processor system 100. In such examples, dirty cache lines are relatively quickly written back to main memory (e.g., the non-volatile memory 150) to preserve the data state of any modifications made to data in the cache lines 122 of FIG. 1. In some examples, the process 600 may additionally or alternatively be performed to identify when to perform a background flush of one or more dirty cache lines.

At block 610 of the illustrated example, the event identifier 210 (FIGS. 2, 3, and 4) of the cache controller 110 monitors the processor system 100 to determine when a full flush event is detected (e.g., in response to a system failure, removal of power, a user instruction, etc.). When a full flush event is detected by the event identifier 210 at block 610, control advances to block 620. At block 620, the cache controller 110 retrieves dirty cache line addresses (DIRTY_TAG$_j$) 252, 352 from the dirty cache line address data structure 250, 350. At block 630, the cache controller 110 provides the cache line addresses (TAG$_i$) 126 corresponding to the dirty cache line addresses (DIRTY_TAG$_j$) 252, 352 to the memory controller 132 (and/or other flush controller) to identify the cache line addresses (TAG$_i$) 126 that are to be flushed. In this manner, the memory controller 132, the processor core 130, and/or other flush controller may perform a flush of the identified dirty cache lines in the cache 120 that have yet to be written back to the non-volatile memory 150. Because examples disclosed herein limit the number of dirty cache lines corresponding to the non-volatile memory 150, this increases the likelihood of having sufficient power and/or resources to execute the operations of blocks 610, 620, and 630 of the process 600. This increases the likelihood that the non-volatile memory 150 is fully updated with recently modified cache data prior to a shutdown of the processor system 100 and/or in response to a full flush instruction from the processor system 100. After block 630, control advances to block 670.

Returning to block 610, when the event identifier 210 does not detect a full flush event, control advances to block 640. At block 640, the event identifier 210 (FIGS. 2, 3, and/or 4), determines whether to initiate a background process to flush one or more dirty cache lines. For example, the event identifier 210 may determine whether a background flush can be performed, for example, to increase the likelihood that a number of dirty cache line addresses (DIRTY_TAG$_j$) 252, 352 does not reach or exceed the capacity limit M. Accordingly, at block 640, the event identifier 210 monitors the processor system 100 to determine whether a dirty cache line in the cache 120 may be flushed via a background process. In some examples, at block 640, the event identifier 210 may determine whether one or more dirty caches line in the cache 120 corresponding to a dirty cache line address (DIRTY_TAG$_j$) 252, 352 may be flushed based on availabilities of resources (e.g., processing power of the processor core 130). In some examples at block 640, the event identifier 210 identifies a number of operations (e.g., instructions that are being executed) that are occurring or that are expected to occur (and/or the corresponding resources needed for the operations). If sufficient resources remain to flush one or more dirty cache lines while normal operation of the processor system 100 is ongoing without relatively affecting the normal operation, the event identifier 210 may determine that a background flush can be performed. In such examples, a background process may be performed to flush one or more dirty cache lines to the non-volatile memory regardless of whether the number of dirty cache lines is less than, equal to, or greater than a capacity limit of M dirty cache line addresses (DIRTY_TAG$_j$) 252, 352 in the dirty cache line address data structure 250, 350. In such examples, the background process may be performed without being based on (or caused by) a received store event (e.g., the store event does not cause a flush of a dirty cache line address to allow a new dirty cache line address (DIRTY_TAG$_j$) 252, 352 to be tracked in the dirty cache line address data structure 250, 350). If the event identifier 210 determines at block 640 that no dirty cache lines should be flushed using a background process (e.g., because there are insufficient resources to perform a flush), then control returns to block 610.

When the event identifier 110 determines at block 640 that a dirty cache line can be flushed using a background process, the cache controller 110 uses dirty address updater 240, 340 at block 650 to select one or more dirty cache line address(es) (DIRTY_TAG$_j$) 252, 352 to remove from the dirty cache line address data structure 250, 350. In the illustrated example, the dirty cache line address(es) (DIRTY_TAG$_j$) 252, 352 indicate that the corresponding cache line address(es) (TAG$_i$) 126 is to be flushed. Selection of the dirty cache line address(es) (DIRTY_TAG$_j$) 252, 352, at block 650, may be made based on any type of hierarchical cache line removal technique. For example, the cache controller 110 may select one or more dirty cache line addresses (DIRTY_TAG$_j$) 252, 352 based on a FIFO approach, a least frequently used cache line removal approach, and/or an LRU cache line removal approach.

At block 660 of the illustrated example, the flush indicator 260 the cache line address(es) (TAG$_i$) 126 corresponding to the selected dirty cache line addresses (DIRTY_TAG$_j$) 252, 352 to the memory controller 132, the processor core 130, and/or any other flush controller identifying which of the cache lines 122 in the cache 120 are to be flushed. In this manner, the memory controller 132, the processor core 132, and/or any other flush controller can perfrom a background flush. Accordingly, the operations of blocks 640, 650, and 660 of the example process 600 of FIG. 6 may be used to determine when to flush dirty cache lines in the cache 120 using a background process. After block 660, control advances to block 670.

At block 670, the cache controller 110 determines whether to continue monitoring the processor system 100 for cache flush events. When the cache controller 110 is to continue monitoring the processor system 100, control returns to block 610. When the cache controller 110 is not to continue monitoring the processor system 100, the process 600 ends (block 690).

Figure 7:
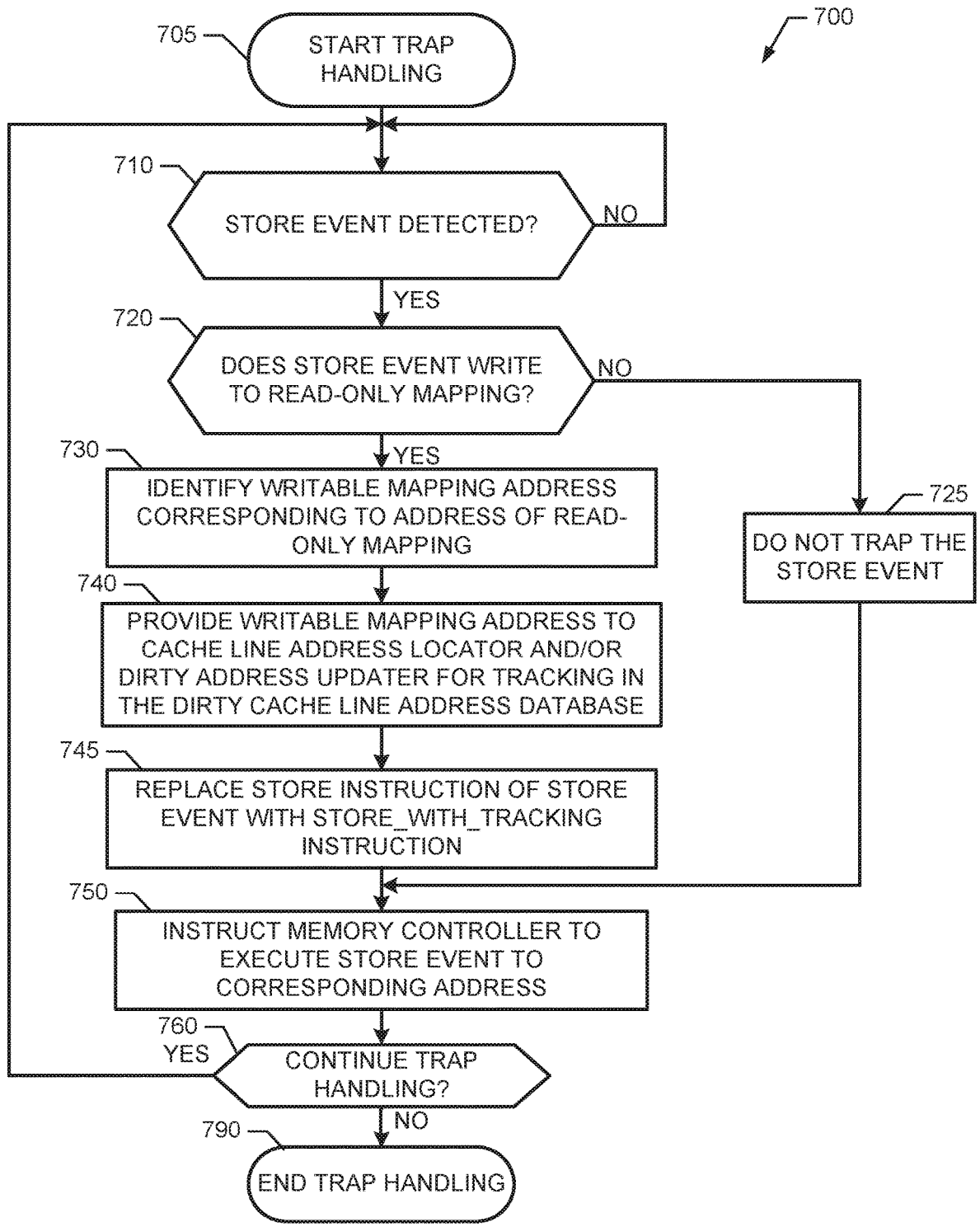
FIG. 7 is a flowchart representative of example machine readable instructions that may be executed to implement the example instruction trapper of FIG. 4.

A flowchart representative of example machine readable instructions for implementing the instruction trapper 420 of FIG. 4 is shown in FIG. 7. In this example, the machine readable instructions comprise a process for execution by a processor such as the processor core 130 shown in the example processor platform 100 discussed above in connection with FIG. 1. The process may be embodied in software stored on a tangible computer readable storage medium such as a CD-ROM, a floppy disk, a hard drive, a digital versatile disk (DVD), a Blu-ray disk, or a memory associated with the processor core 130, but the entire process and/or parts thereof could alternatively be executed by a device other than the processor core 130 and/or embodied in firmware or dedicated hardware. Further, although the example program is described with reference to the flowchart illustrated in FIG. 7, many other methods of implementing the example instruction trapper 420 may alternatively be used. For example, the order of execution of the blocks may be changed, and/or some of the blocks described may be changed, eliminated, or combined.

The process 700 of FIG. 7 begins with an initiation of the cache controller 402 of FIG. 4 to perform trap handling to identify store instructions that are to be replaced with store_with_tracking instructions (block 705). The process 700 is executed to implement the instruction trapper 420 of FIG. 4 to analyze an address indicated in a store event to determine if the store event corresponds to the non-volatile memory 150 of FIG. 1, and if so, whether to trap the store event and replace a corresponding store instruction with a store_with_tracking instruction as disclosed herein.

At block 710 of FIG. 7, the trap identifier 210 determines when a store event (e.g., executed by the processor core 130 and/or memory controller 132) is detected. If a store event is not detected, the trap identifier 210 continues to monitor for store events. When a store event is detected at block 710, the trap identifier 470 (FIG. 4) determines (e.g., via a write-fault error detection), at block 720, whether the store event writes to an address location represented in the read-only mapping 490 (FIG. 4) corresponding to the non-volatile memory 150. If the store event does not write to a location represented in the read-only mapping 490, the trap handler 480 does not trap the store event (block 725). In some examples, a store event may not write to the read-only mapping 490 because the store event does not correspond to the non-volatile memory 150 (e.g., the store event corresponds to the volatile memory 140 of FIG. 1). In other examples, the store event may not write to the read-only mapping because the store event writes to the writable mapping 492, as the code modifier 452 previously replaced a store instruction with a store_with_tracking instruction, as disclosed herein.

When the trap identifier 470 detects a write to the read-only mapping 490 (block 720), the trap handler 480 (FIG. 4), at block 730, identifies a writable mapping address (e.g., the location (X+D) 496 of FIG. 4) in the writable mapping 492 that corresponds to the read-only mapping address (e.g., the location (X) 494 of FIG. 4) identified in the store event at block 720. In the illustrated example, at block 730, the trap handler 480 identifies the writable mapping address in the writable mapping 492 (FIG. 4) using an offset (e.g., the offset (D) 498 of FIG. 3) relative to the read-only mapping address in the read-only mapping 490.

At block 740, the instruction trapper 420 (FIG. 4) provides the writable mapping address to the cache line address locator 230 (FIG. 4) and/or to the dirty address updater 340 (FIG. 4) for tracking the writable mapping address in the dirty cache line address data structure 350. After block 740, the code modifier 452 replaces the store instruction of the store event with a store_with_tracking instruction as disclosed herein (block 745). The example code modifier 452, at block 745, generates the store_with_tracking instruction using the writable mapping address (e.g., the location (X+D) 496). Once the store_with_tracking instruction has replaced the store instruction, for example, by replacing the store instruction in the software program 456, control advances to block 750. At block 750, the cache controller 402 instructs the memory controller 132 to execute the store at the corresponding address (block 750). In some examples, if, at block 720, the trap identifier 470 determines that the store event does not write to the read-only address mapping 490, the cache controller 402 instructs the memory controller 132 to perform the store event at the address indicated in the store event. In other examples, if the trap identifier 470 determines at block 720 that the store event does write to the read-only mapping 490, then the cache controller 110 instructs the memory controller 132 to perform the store event at a writable address (e.g., an address offset from the address of the read-only mapping) of the writable mapping 492.

At block 760 of the illustrated example, the instruction trapper 420 determines whether to continue trapping writes to the read-only mapping 490 (e.g., via write fault detection, etc.). If the instruction trapper 420 is to continue trap handling, control returns to block 710. If the instruction trapper 420 is not to continue trap handling, the program 700 ends (block 790).

As mentioned above, the example processes of FIGS. 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The coded instructions of FIGS. 5, 6, and/or 7 may be stored in the cache 120, in another local storage of the processor core 130, in the non-volatile memory 150, in the mass storage device 190 of FIG. 1, and/or on a removable tangible computer readable storage medium such as a CD or DVD From the foregoing, it will be appreciated that the above disclosed methods, apparatus, and articles of manufacture enable efficient cache flushing by monitoring a processor system and controlling a quantity of cache allocated to non-volatile memory. Example methods, apparatus, and articles of manufacture provide efficient cache flushing by avoiding unnecessary cache flushes based on whether a modified cache line has yet to be written back to non-volatile memory following a previous modification (e.g., is tracked as a dirty cache line).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
monitoring, using a data structure storing address tags of dirty cache lines, a quantity of the dirty cache lines in a cache that includes cache lines storing data and respective address tags, the dirty cache lines corresponding to data in a main memory;
computing, by a cache controller or a processor, a threshold that is based on a capacity of the data structure and that is less than a cache line storage capacity of the cache wherein computing the threshold comprises adjusting the threshold by the cache controller or the processor based on a frequency of cache flushes from the cache to the main memory;
comparing the quantity of the dirty cache lines to the threshold; and
causing a write back by the cache controller of at least one of the dirty cache lines to the main memory in response to a store event that causes the quantity of the dirty cache lines to satisfy the threshold.

2. The method of claim 1, wherein the store event does not cause the quantity of the dirty cache lines to increase toward the threshold if the store event modifies a dirty cache line in the cache.

3. The method of claim 1, further comprising:
mapping a read-only memory address space and a writable memory address space; and
in response to the store event comprising a store instruction to the read-only memory address space, producing a store-with-tracking instruction to the writable memory address space, the store-with-tracking instruction causing tracking, in the data structure, of a dirty cache line created by the store event by writing an address tag of the store event to the data structure.

4. The method of claim 1, further comprising, in response to processor resources being available, selecting a further dirty cache line of the dirty cache lines to be written back to the main memory using a background process before the quantity of the dirty cache lines satisfies the threshold.

5. The method of claim 1, wherein the quantity of the dirty cache lines satisfies the threshold if the quantity of the dirty cache lines is greater than or equal to the threshold.

6. The method of claim 1, wherein the data structure comprises a hash table comprising locations that map to corresponding address tags, the locations of the hash table comprising entries storing the address tags of the dirty cache lines.

7. The method of claim 1, further comprising:
receiving a further store event that includes a first address tag that maps to an entry of the data structure; and
in response to detecting that the entry already stores a second address tag, causing a write back by the cache controller of a dirty cache line corresponding to the second address tag from the cache to the main memory.

8. The method of claim 1, wherein each address tag of the address tags stored in the data structure comprises a portion of a respective memory address corresponding to a location of the main memory.

9. The method of claim 1, wherein adjusting the threshold comprises increasing, by the cache controller or the processor, the threshold based on determining that the frequency of cache flushes from the cache to the main memory has decreased.

10. A non-transitory machine readable storage medium comprising instructions that, when executed, cause a machine to:
monitor, using a data structure storing address tags of dirty cache lines, a quantity of the dirty cache lines in a cache that includes cache lines storing data and respective address tags, the dirty cache lines corresponding to data in a main memory;
compute a threshold that is based on a capacity of the data structure and that is less than a cache line storage capacity of the cache, wherein computing the threshold comprises adjusting the threshold by the machine based on a frequency of cache flushes from the cache to the main memory;
compare the quantity of the dirty cache lines to the threshold that is based on the capacity of the data structure and that is less than the cache line storage capacity of the cache; and cause a write back of at least one of the dirty cache lines to the main memory in response to a store event that causes the quantity of the dirty cache lines to satisfy the threshold.

11. The non-transitory machine readable storage medium of claim 10, wherein the store event does not cause the quantity of the dirty cache lines to increase toward the threshold if the store event modifies a dirty cache line.

12. The non-transitory machine readable storage medium of claim 10, wherein the instructions, when executed cause the machine to:
map a read-only memory address space and a writable memory address space; and
in response to the store event comprising a store instruction to the read-only memory address space, produce a store-with-tracking instruction to the writable memory address space, the store-with-tracking instruction causing tracking, in the data structure, of a dirty cache line created by the store event by writing an address tag of the store event to the data structure.

13. The non-transitory machine readable storage medium of claim 10, wherein the data structure is a hash table separate from the cache, the hash table comprising locations that map to corresponding address tags.

14. The non-transitory machine readable storage medium of claim 12, wherein the producing is performed as part of trapping the store instruction of the store event.

15. An integrated circuit comprising:
a dirty address updater to:
monitor, using a data structure storing address tags of dirty cache lines, a quantity of the dirty cache lines in a cache that includes cache lines storing data and respective address tags, the dirty cache lines storing data to be written back to a non-volatile memory,
adjust a threshold that is based on a capacity of the data structure and that is less than a cache line storage capacity of the cache, wherein adjusting the threshold is further based on a frequency of cache flushes from the cache to the non-volatile memory, and
compare the quantity of the dirty cache lines to the threshold; and
a flush indicator to cause a write back of at least one of the dirty cache lines to the non-volatile memory in response to a store event that causes the quantity of the of dirty cache lines to satisfy the threshold.

16. The integrated circuit of claim 15, wherein the store event does not cause the quantity of the dirty cache lines to increase if the store event modifies a dirty cache line.

17. The non-transitory machine readable storage medium of claim 10, herein adjusting the threshold comprises increasing, by the machine, the threshold based on determining that the frequency of cache flushes from the cache to the main memory has decreased.

18. The integrated circuit of claim 15, wherein the dirty address updater is to receive a further store event that includes a first address tag that maps to an entry of the data structure, and
wherein the flush indicator is to, in response to detecting that the entry already stores a second address tag, cause a write back by a cache controller of a dirty cache line corresponding to the second address tag from the cache to the non-volatile memory.

19. The integrated circuit of claim 18, wherein the data structure comprises a hash table comprising locations that map to corresponding address tags.

* * * * *